United States Patent
Kim et al.

(10) Patent No.: US 12,481,060 B2
(45) Date of Patent: Nov. 25, 2025

(54) METHOD FOR OPERATING RSU RELATED TO VRU LOCATION IN WIRELESS COMMUNICATION SYSTEM

(71) Applicant: LG ELECTRONICS INC., Seoul (KR)

(72) Inventors: Myoungseob Kim, Seoul (KR); Hakseong Kim, Seoul (KR); Hanbyul Seo, Seoul (KR); Jonghun Song, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 510 days.

(21) Appl. No.: 17/997,523

(22) PCT Filed: Apr. 29, 2021

(86) PCT No.: PCT/KR2021/005463
§ 371 (c)(1),
(2) Date: Oct. 28, 2022

(87) PCT Pub. No.: WO2021/221481
PCT Pub. Date: Nov. 4, 2021

(65) Prior Publication Data
US 2023/0176212 A1    Jun. 8, 2023

(30) Foreign Application Priority Data

Apr. 29, 2020  (KR) .................. 10-2020-0052594
Jun. 9, 2020   (KR) .................. 10-2020-0069349

(51) Int. Cl.
*G01S 17/04*   (2020.01)
*G01S 7/497*   (2006.01)
*G01S 19/40*   (2010.01)

(52) U.S. Cl.
CPC .............. *G01S 17/04* (2020.01); *G01S 7/497* (2013.01); *G01S 19/40* (2013.01)

(58) Field of Classification Search
CPC .......... G01S 17/04; G01S 7/497; G01S 19/40; G01S 5/0009; G01S 19/396;
(Continued)

(56) References Cited

U.S. PATENT DOCUMENTS 10,490,075 B2 *  11/2019  Bai .................. H04W 4/027
10,906,535 B2 *   2/2021  Solmaz ............. G08G 1/0129
(Continued)

FOREIGN PATENT DOCUMENTS

JP    11037776     2/1999
JP    2002257564   9/2002
(Continued)

OTHER PUBLICATIONS

JP-2014137321-A, Fukumoto, Position Coordinate Conversion System . . . .. Coversion Program, NEC Corp, Jul. 28, 2014,, All pages and figureS. (Year: 2014).*

(Continued)

*Primary Examiner* — Mahendra R Patel
(74) *Attorney, Agent, or Firm* — LEE, HONG, DEGERMAN, KANG & WAIMEY

(57) ABSTRACT

An embodiment relates to a method for performing operations related to a vulnerable road user (VRU) by a road side unit (RSU) in a wireless communication system, the operations comprising: receiving, by the RSU, personal safety messages (PSMs) of a VRU; determining, by the RSU, location information of the VRU on the basis of first location information of the VRU obtained through image information and second location information of the VRU obtained through the PSMs; and transmitting, by the RSU, the location information of the VRU to the VRU.

14 Claims, 30 Drawing Sheets

(58) Field of Classification Search
CPC ....... G01S 19/485; H04W 12/03; H04W 4/02;
H04W 4/027; H04W 4/40; H04W 4/90;
H04W 4/025; H04W 4/12; G06T 7/70;
G06T 7/80
USPC ...................................................... 455/456.1
See application file for complete search history.

(56) References Cited

U.S. PATENT DOCUMENTS

| | | | | |
|---|---|---|---|---|
| 2015/0177003 | A1* | 6/2015 | Ho | H04W 4/02 701/408 |
| 2016/0012445 | A1* | 1/2016 | Villa-Real | G06Q 20/4016 705/44 |
| 2019/0244521 | A1* | 8/2019 | Ran | G08G 1/22 |
| 2019/0251847 | A1* | 8/2019 | Wu | G08G 1/056 |

FOREIGN PATENT DOCUMENTS

| | | | | | |
|---|---|---|---|---|---|
| JP | 2002257564 | A | * | 9/2002 | |
| JP | 2008249666 | | | 10/2008 | |
| JP | 2010276583 | | | 12/2010 | |
| JP | 2014137321 | | | 7/2014 | |
| JP | 2014137321 | A | * | 7/2014 | |
| JP | 2018525632 | | | 9/2018 | |
| JP | 2018180860 | | | 11/2018 | |
| JP | 2019079487 | | | 5/2019 | |
| JP | 2019091168 | | | 6/2019 | |
| KR | 1020090013026 | | | 2/2009 | |
| KR | 1020140126852 | | | 3/2014 | |
| KR | 2014126852 | A | * | 11/2014 | |
| KR | 20190032090 | A | * | 3/2019 | ............ G07C 5/008 |
| KR | 1020190032090 | | | 3/2019 | |

OTHER PUBLICATIONS

KR 20190032090 A, Electronic Device for Transmitting a Lee Seung Cheol, Relay Message to External Vehicle and the Method Thereof, Samsung Electronics Co Ltd, Mar. 27, 2019 (Year: 2019).*
PCT International Application No. PCT/KR2021/005463, International Search Report dated Aug. 27, 2021, 3 pages.
Korean Intellectual Property Office Application No. 10-2022-7039901, Office Action dated Jul. 17, 2024, 8 pages.
Japan Patent Office Application No. 2022-565832, Notice of Allowance dated Dec. 12, 2023, 4 pages.

* cited by examiner (a)

(b)

(a)

(b)

(a)

(b)

(a)

(b)

(a)

(b)

(c)

(a)

(b)

(a)

(b)

(c)

(d)

(a)

(b)

METHOD FOR OPERATING RSU RELATED TO VRU LOCATION IN WIRELESS COMMUNICATION SYSTEM

CROSS-REFERENCE TO RELATED APPLICATION(S)

This application is the National Stage filing under 35 U.S.C. 371 of International Application No. PCT/KR2021/005463, filed on Apr. 29, 2021, which claims the benefit of earlier filing date and right of priority to Korean Application Nos. 10-2020-0052594, filed on Apr. 29, 2020, and 10-2020-0069349, filed on Jun. 9, 2020, the contents of which are all incorporated by reference herein in their entirety.

TECHNICAL FIELD

The present disclosure relates to a wireless communication system, and more particularly, to a method of operating a Road Side Unit (RSU) related to a Vulnerable Road User position.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Technical tasks of embodiment(s) are to provide a method of operating a Road Side Unit (RSU) on how to measure/determine/correct a Vulnerable Road User (VRU) position.

In one technical aspect of the present disclosure, provided is a method of operating a Road Side Unit (RSU) related to a Vulnerable Road User (VRU) in a wireless communication system, the method including receiving a Personal Safety Messages (PSM) message of the VRU by the RSU, determining a position information of the VRU by the RSU based on a first position information of the VRU obtained through an image information and a second position information of the VRU obtained through the PSM message, and transmitting the position information of the VRU to the VRU by the RSU.

In another technical aspect of the present disclosure, provided is a Road Side Unit (RSU) performing a Vulnerable Road User (VRU) related operation, the RSU including at least one processor and at least one computer memory operably connected to the at least one processor and storing instructions to enable the at least one processor to perform operations, the operations including receiving a PSM message of a VRU, determining a position information of the VRU based on a first position information of the VRU obtained through an image information and a second position information of the VRU obtained through the PSM message, and transmitting the position information of the VRU to the VRU.

In further technical aspect of the present disclosure, provided is a processor performing operations for a Road Side Unit (RSU) in a wireless communication system, the operations including receiving a PSM message of a VRU, determining a position information of the VRU based on a first position information of the VRU obtained through an image information and a second position information of the VRU obtained through the PSM message, and transmitting the position information of the VRU to the VRU.

In another technical aspect of the present disclosure, provided is a non-volatile computer-readable storage medium storing at least one computer program including an instruction for enabling at least one processor to perform operations for a UE when executed by the at least one processor, the operations including receiving a PSM message of a VRU, determining a position information of the VRU based on a first position information of the VRU obtained through an image information and a second position information of the VRU obtained through the PSM message, and transmitting the position information of the VRU to the VRU.

In another technical aspect of the present disclosure, provided is a method of operating a Vulnerable Road User (VRU) related to a Road Side Unit (RSU) in a wireless communication system, the method including transmitting a PSM message to the RSU by the VRU and receiving a position information of the VRU from the RSU by the VRU, wherein the position information of the VRU may be determined based on a first position information of the VRU obtained by the RSU through an image information and a second position information of the VRU obtained through the PSM message.

In another further technical aspect of the present disclosure, provided is a Vulnerable Road User (VRU) related to a Road Side Unit (RSU) in a wireless communication system, the VRU including at least one processor and at least one computer memory operably connected to the at least one processor and storing instructions to enable the at least one processor to perform operations, the operations including transmitting a PSM message to the RSU by the VRU and receiving a position information of the VRU from the RSU by the VRU, wherein the position information of the VRU may be determined based on a first position information of the VRU obtained by the RSU through an image information and a second position information of the VRU obtained through the PSM message.

When the position information of the VRU is determined, a weight may be applied to each of the first and second position informations.

The image information may be taken by the RSU in an observation area so as to be shared with another RSU.

The position information of the VRU may be shared with the another RSU.

The position information of the VRU may include a weight information of the first position information for the second position information used for position determination.

The PSM message may include the position information obtained by the VRU through Global Navigation Satellite System (GNSS).

The PSM message may include the position information obtained by the VRU through another RSU, another VRU or a base station.

The position information of the VRU may be determined as a value having a small error range in the first position information and the second position information.

The position information of the VRU may be determined based on an error range resulting from averaging an error range of the first position information and an error range of the second position information.

The position information of the VRU may be included in an intersection between an area corresponding to the error range of the first position information and an area corresponding to the error range of the second position information.

According to one embodiment, a position of a VRU can be measured/corrected more accurately using an image of an RSU.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
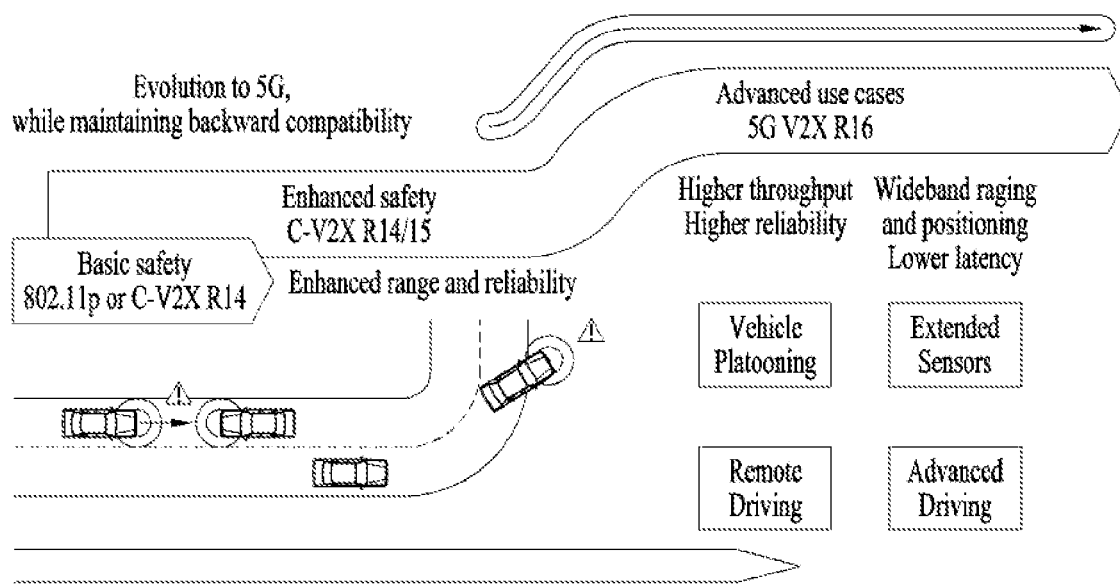
FIG. 1 is a diagram comparing vehicle-to-everything (V2X) communication based on pre-new radio access technology (pre-NR) with V2X communication based on NR.
Figure 2:
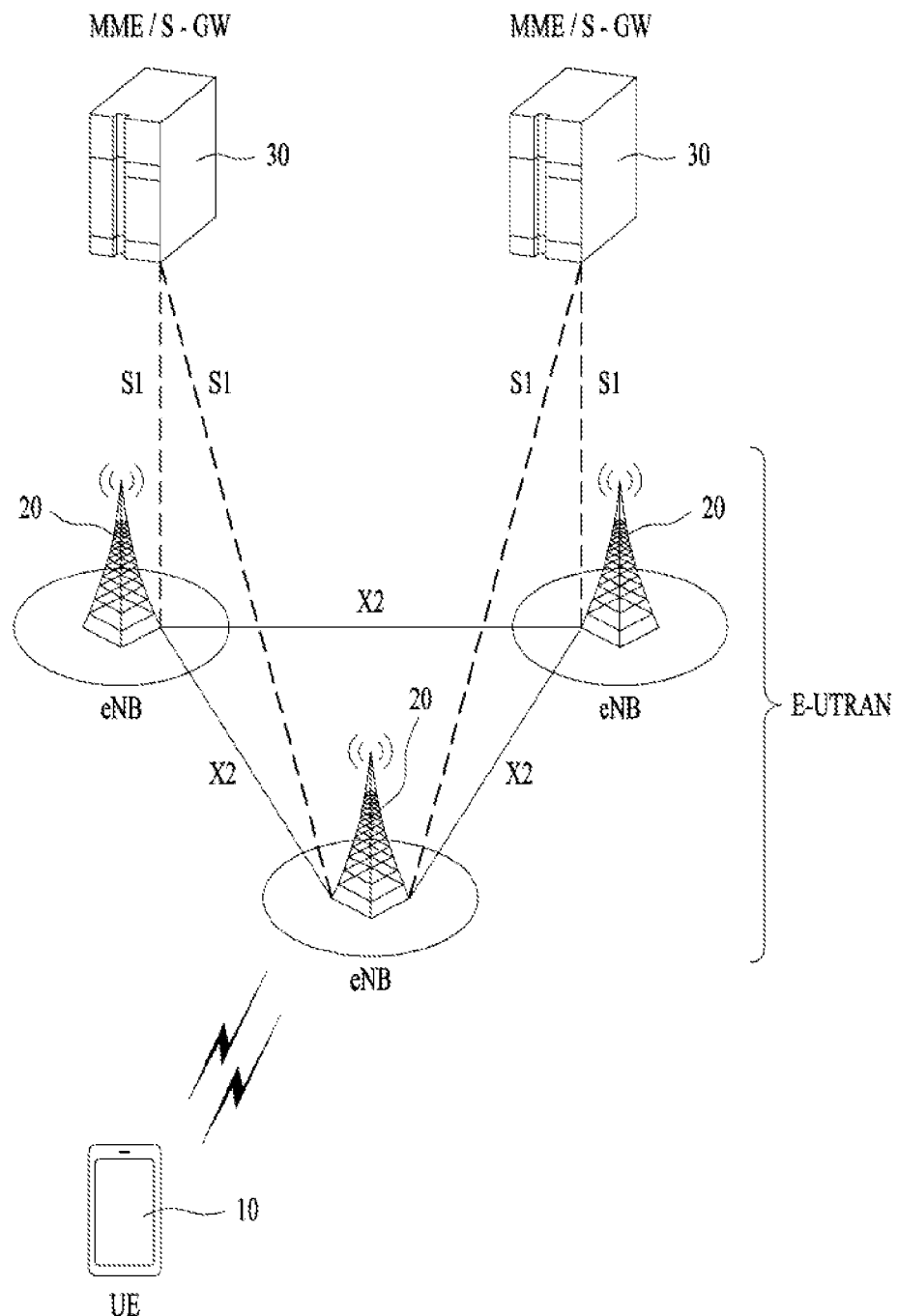
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
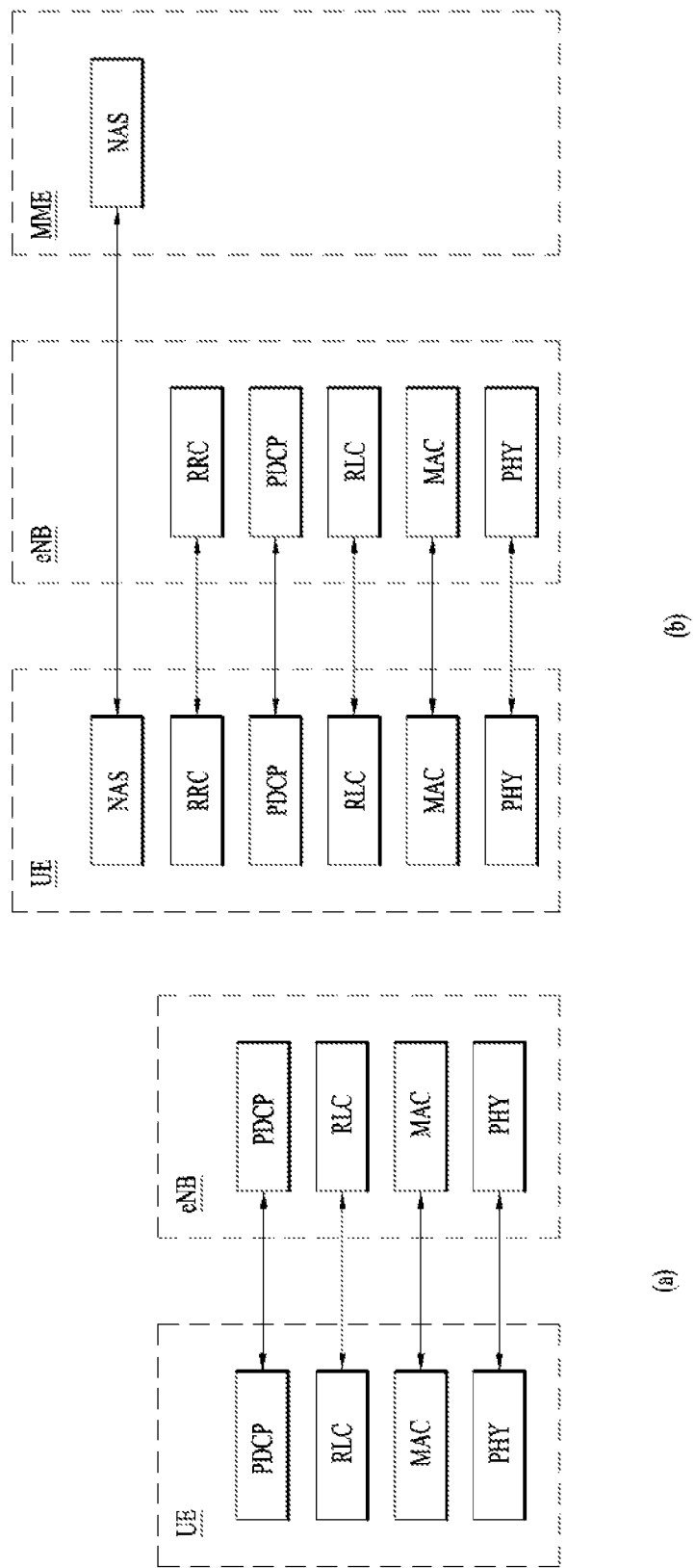
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
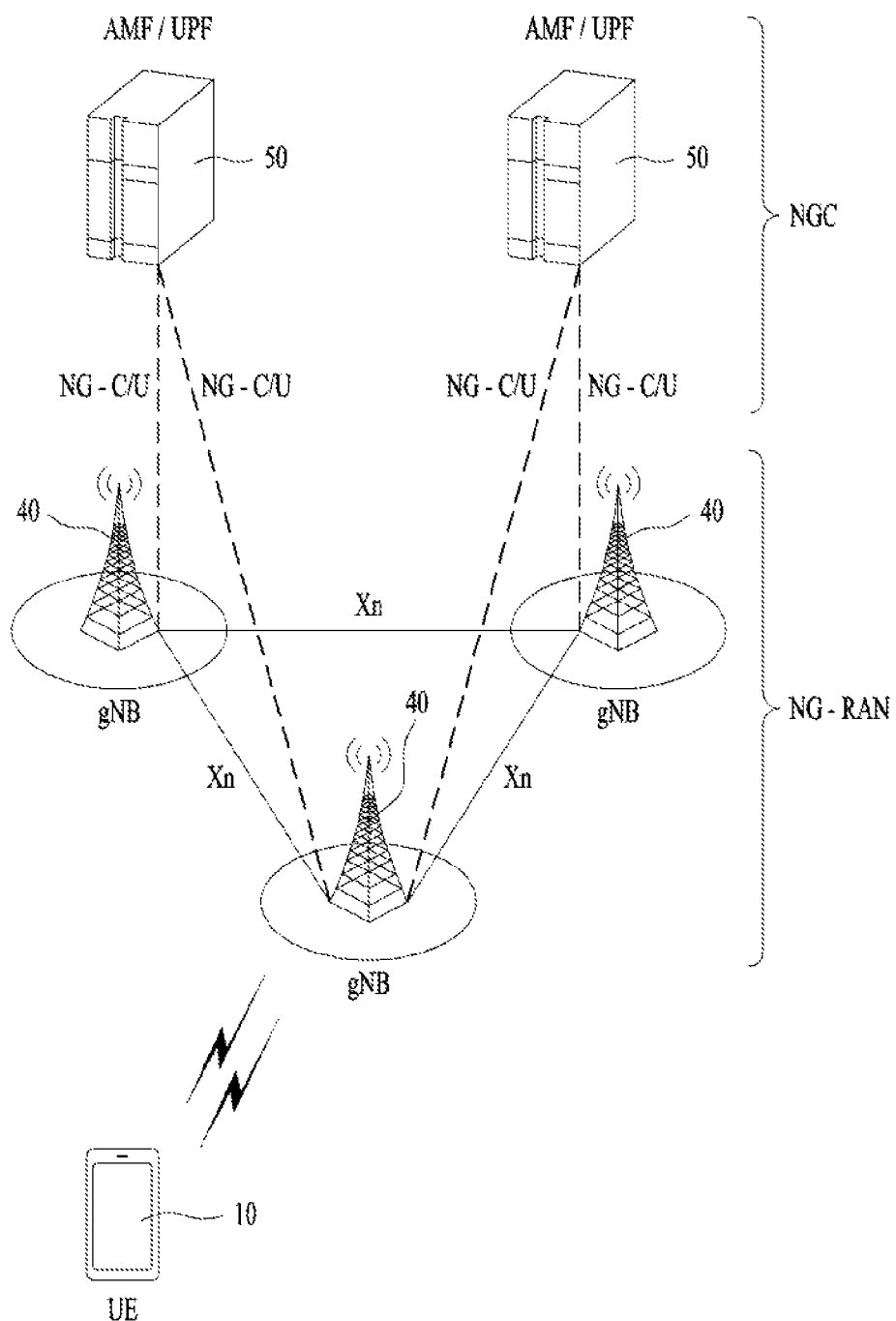
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
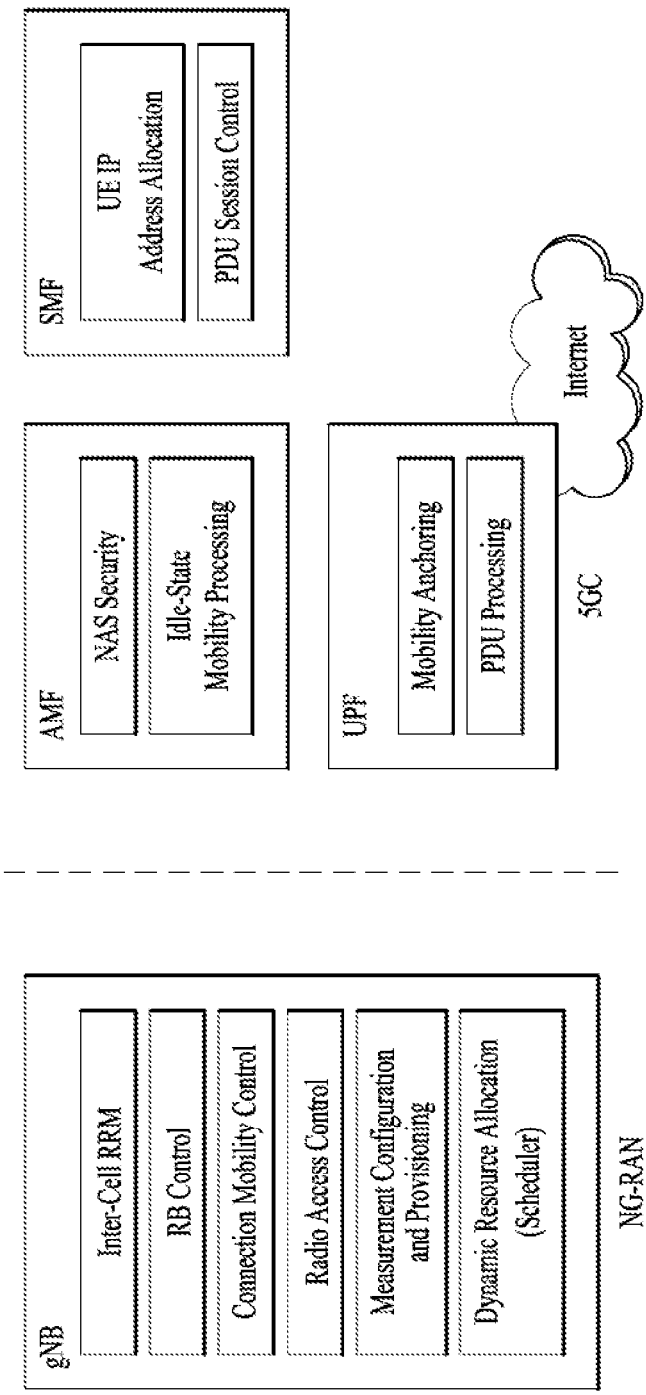
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
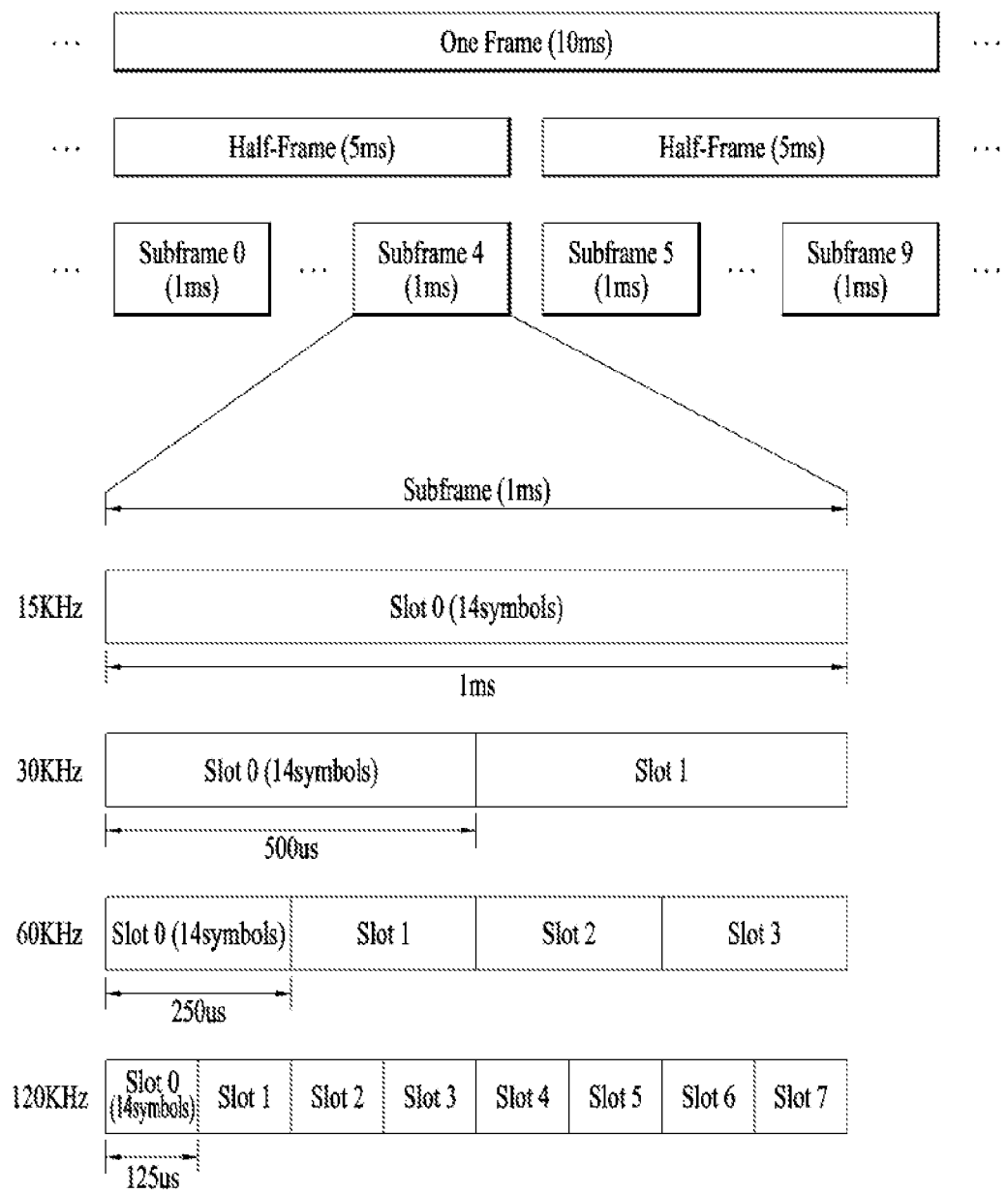
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot $N^{slot}_{symb}$, the number of slots per frame $N^{frame,\mu}_{slot}$, and the number of slots per subframe $N^{subframe,\mu}_{slot}$ to an SCS configuration μ in the NCP case.

TABLE 1

| SCS (15*2u) | $N^{slot}_{symb}$ | $N^{frame,\mu}_{slot}$ | $N^{subframe,\mu}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N^{slot}_{symb}$ | $N^{frame,\mu}_{slot}$ | $N^{subframe,\mu}_{slot}$ |
| --- | --- | --- | --- |
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
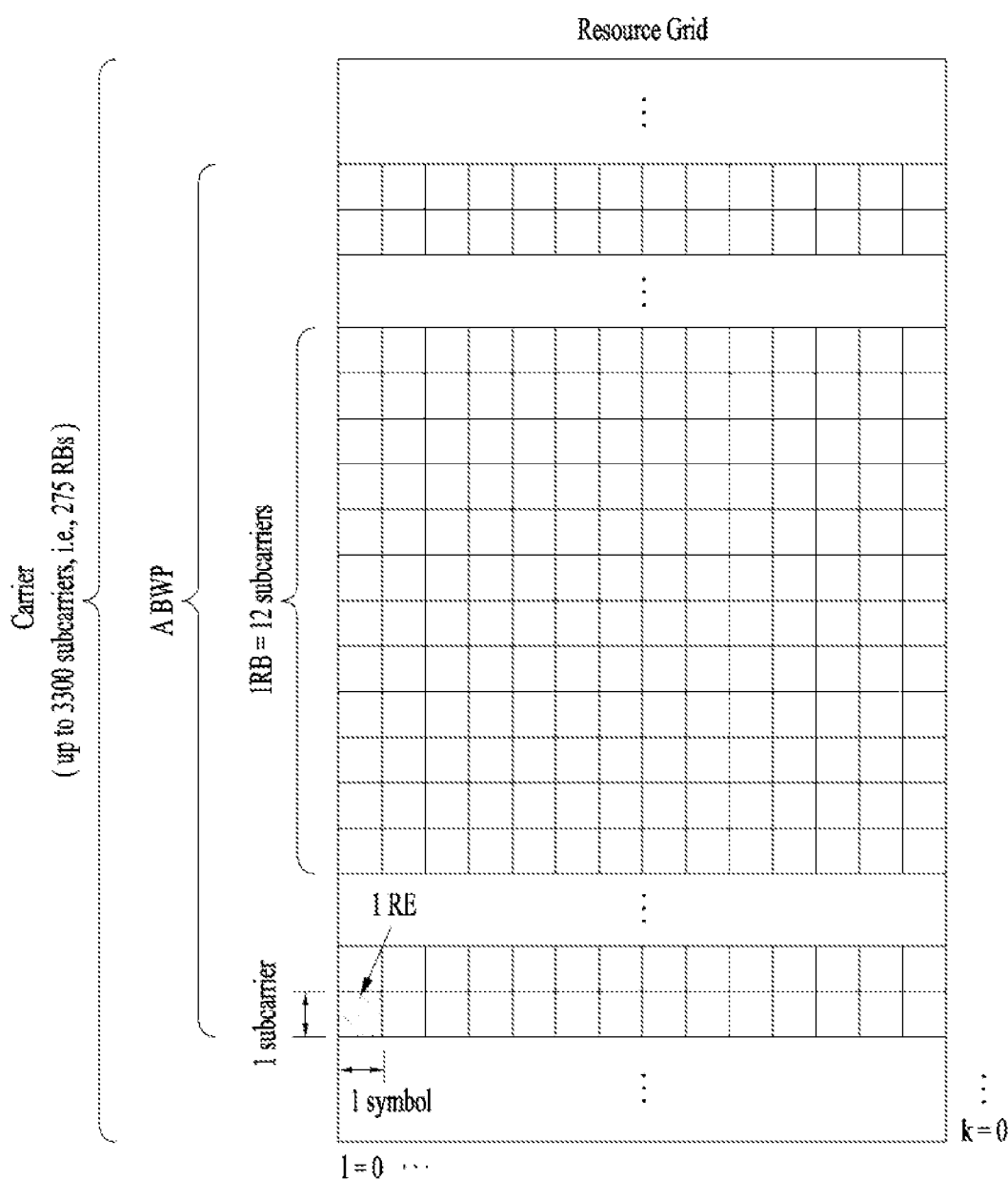
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
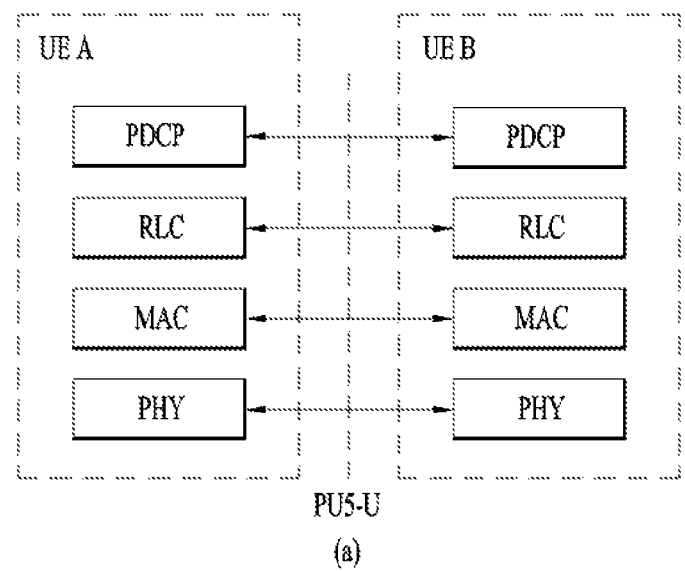
FIG. 8 is a diagram illustrating radio protocol architectures for sidelink (SL) communication according to an embodiment of the present disclosure.
Figure 8:
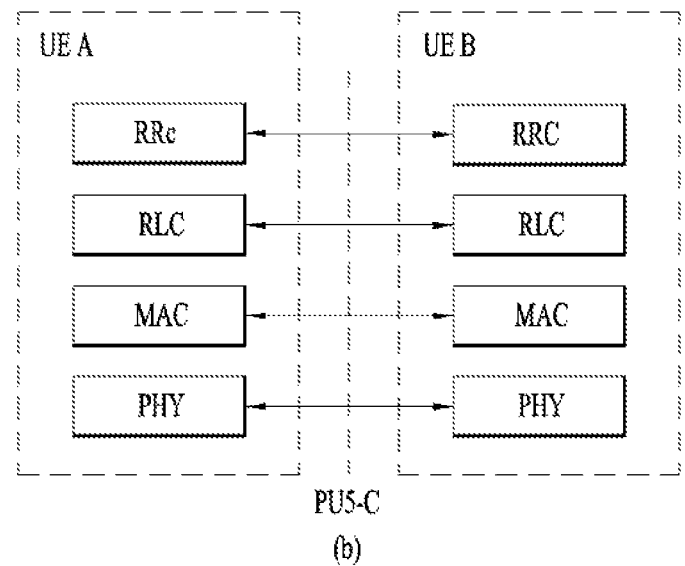

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
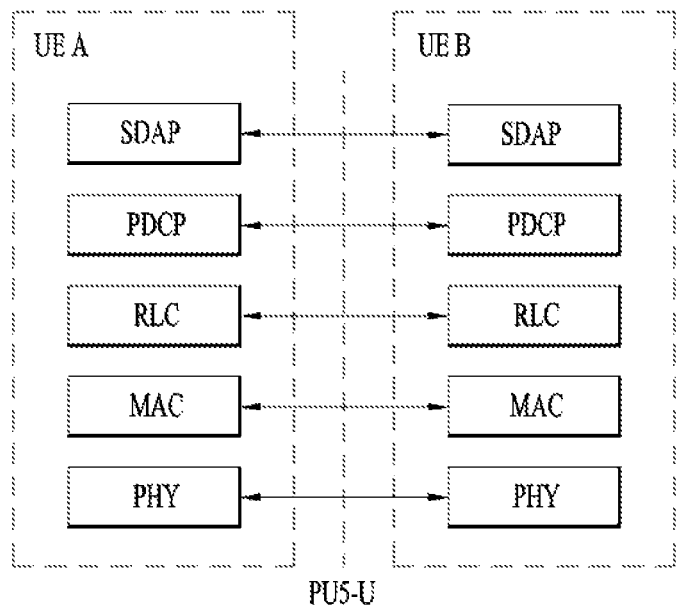
FIG. 9 is a diagram illustrating radio protocol architectures for SL communication according to an embodiment of the present disclosure.
Figure 9:
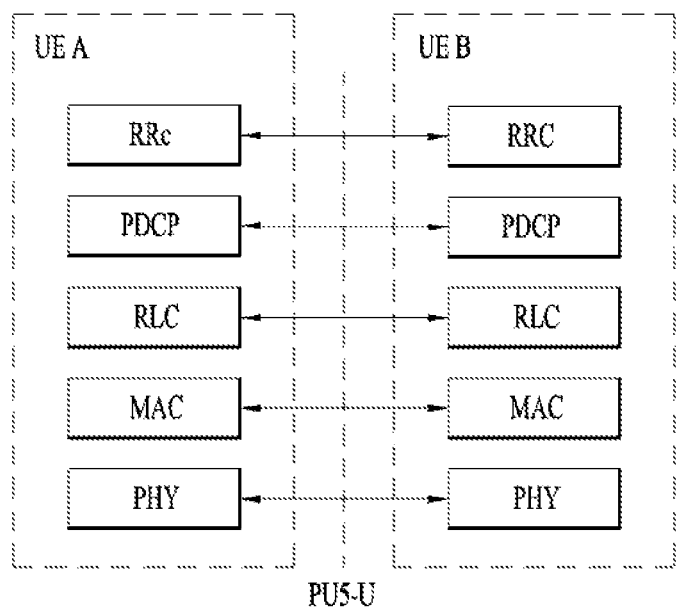

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
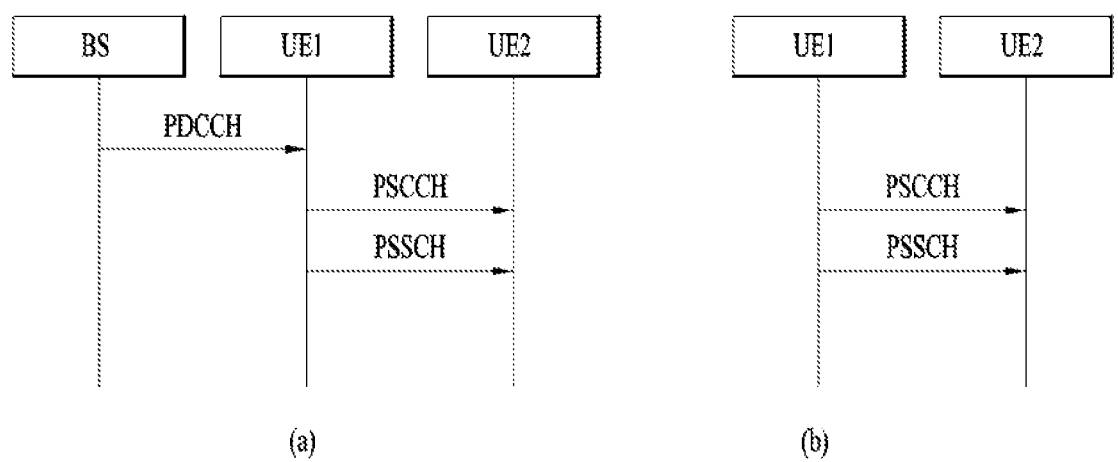
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Meanwhile, in measuring information related to a specific target, e.g., position information and the like, when a plurality of entities observe the corresponding target, each of the entities may have a different measurement error value and a specific measurement value among them may include a data having a small error range or high reliability. Alternatively, if data processing is performed by taking many samples despite that the measurement values have the same statistical properties (e.g., error range), data of high reliability may be obtained by reducing the error range. Hence, the measurement values are referred to and used in determining a presence or non-presence of existence/detection of a specific entity or positioning of better performance may be available.

A road user such as a vehicle, an infrastructure such as an RSU, and the like receive a V2X message (e.g., a VRU or pedestrian related message) from a surrounding road user (e.g., a target VRU, a target pedestrian, a target surrounding vehicle, etc.) or a surrounding higher network (e.g., collected and distributed by an eNB, a V2X server, etc.), and such a message may include a position information and the like of a specific road user (e.g., a VRU, a pedestrian, etc.) that becomes a target for example. In this case, regarding the position information, when information obtained by the specific road user through GNSS information is forwarded from the corresponding user directly or through the network, a measurement error of a GNSS receiver may be included in the corresponding V2X message. When a device capable of detecting a position of the road user exists in the specific road user or the infrastructure, a position of the corresponding road user may be detected and compared with the received information. As a result, if there is a difference from the information directly detected by itself through a camera, other ADAS sensor, a device and the like, the received information (minimum) and the detected information are compared with each other and then fed back (to a transmitting side) or a modified information is forwarded to a surrounding road user. Alternatively, when receiving a PSM of a specific UE or VRU, the RSU may correct position information included in the received PSM based on position information of the specific UE or VRU and then notify (or feed back) it to a surrounding VRU, a surrounding UE, or a network. Here, the RSU may transmit the corrected position information to surrounding VRUs through sidelink signals such as PSCCH, PSSCH, etc.

Hereinafter, RSU-based VRU detection will be described as a detailed example of the above description. Hereinafter, a method of deriving and transmitting the related information by mapping it to a specific field of a PSM message is shown as an embodiment of transmitting the detected and corrected VRU information. Yet, the transmission of the VRU related message is not limited to the PSM message, and may be transmitted in a manner of being loaded into any type of message that can use or spread VRU information such as VAM, CPM, or other types of V2X messages An RSU is an infrastructure capable of performing direct communication (e.g., PC5 interface) with road users such as a VRU and a vehicle through V2X dedicated spectrum, and may be used to detect and predict a collision between a VRU and a vehicle (or another road user) and improve the protection of a VRU based on a function of detecting the VRU failing to have a communication equipment. In addition, the RSU transmits the collected information of road users to a base station through a cellular spectrum (e.g., Uu interface) and enables a higher V2X server to process the corresponding information, thereby enabling surrounding road users to receive information on safety messages. To this end, the RSU may be located near a VRU on a road, in a VRU concentrated zone on a road, and the like. In this case, the RSU may play roles in detecting a VRU with a provided camera, receiving a message transmitted by the VRU, and forwarding the received message to surrounding road users.

Figure 11:
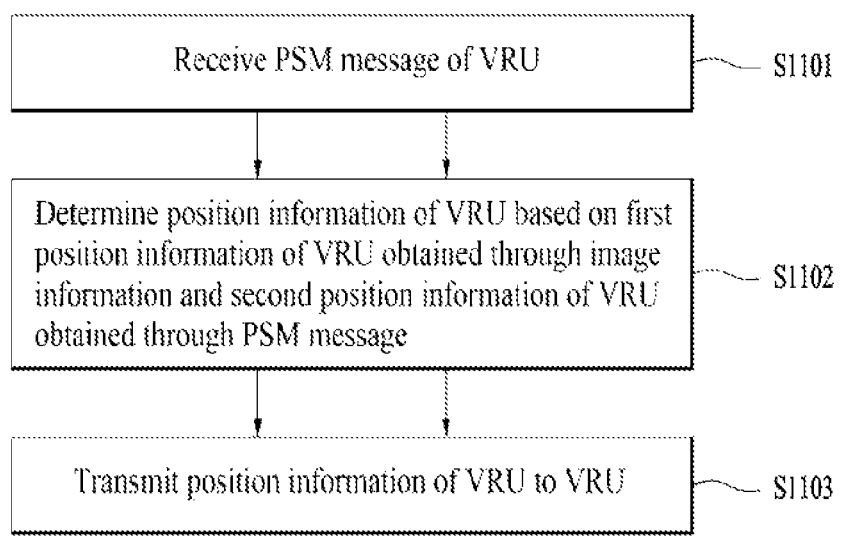
FIGS. 11 to 23 are diagrams to describe embodiment(s).

An RSU according to one embodiment may receive a PSM message (or a Collective Perception Message (CPM), other V2X message, etc.) of a VRU [S1101 in FIG. 11], and determine a position information of the VRU based on a first position information of the VRU obtained through an image information and a second position information of the VRU obtained through the PSM message [S1102 in FIG. 11]. The RSU may transmit the position information of the VRU to the VRU [S1103 in FIG. 11].

The position information of the VRU may be provided to another VRU or RSU. Here, the position information of the VRU may include a value corresponding to a correction level or reliability. Here, the value corresponding to the correction level or reliability may include a ratio or weight level of the position information obtained from the image information to PSM information, a value corresponding thereto, or information related to accuracy of corrected position information described later. For example, the position information of the VRU may include weight information of the first position information on the second position information used for position determination Also, the position information of the VRU or the position information exchanged between subjects before correction may include source related information (e.g., position information on a target VRU obtained from another RSU, directly obtained position information on a target VRU, position information on a target VRU obtained from another VRU, etc.) of the obtained position information.

In the above example, as a message spread to surroundings by a VRU such as a pedestrian or a road user who is not a vehicle driver, the PSM message is used to broadcast safety data including a road user's movement statuses (e.g., position, speed, direction, etc.) and information (e.g., path history, position error, etc.) related thereto. In particular, it is transmitted to surrounding vehicles and used as a warning message to identify and alert road users who are difficult to detect through driver's naked eyes, car sensors and the like, and may perform additional functions such as predicting a road user's moving route, grasping density and the like through various informations in the PSM message.

In the above example, the VRU is a road user, which means a vulnerable user who is not a vehicle driver, and in the European Commission (EC) ITS guidelines, is defined as a nonpowered road user such as a pedestrian, a bicycle user, a motorcyclist, a disabled or mobility impaired person, etc. The VRU may or may not have communication equipment such as V2X. Among VRUs having communication equipment, a VRU having a GNSS (or GPS) may measure its own position through this. In this case, the PSM message may include position information obtained by the VRU through the GNSS. A VRU without the GNSS may know its position through an RSU, VRU, or base station. In case of such a VRU, the PSM message may include position information obtained by the VRU through another RSU, another VRU, or a base station. For example, in FIG. 12, a VRU may receive position information and position error information from a GNSS (or, the position error information may be predetermined depending on a received GNSS service, a type of a satellite, etc.) and spread them to surroundings, and such information may be forwarded to a surrounding RSU directly or through a network or the like. The VRU transmits the position information measured through GNSS, etc., to a surrounding road user (PC5) and/or a network (Uu interface) via a PSM message. In doing so, although the results measured through the GNSS may be corrected through applications, etc., an error range of about 10m level may be assumed in general (based on a personal communication device).

Figure 12:
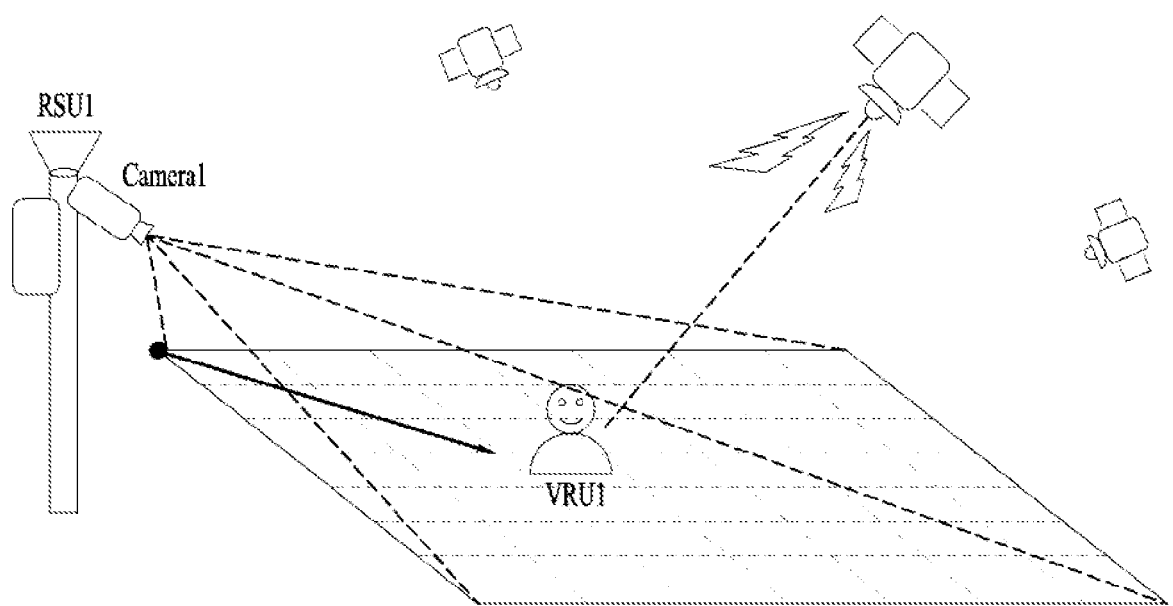

The image information may be photographed by the RSU in an observation area, and the image information may be shared with other RSUs. Here, the RSU is an RSU including a function of obtaining and processing image information, and may have the ability to extract and utilize position information based on image information. To this end, the RSU may include devices such as cameras/camcorders for direct image capture and an image processing device, or may connected to these devices by wire/wireless. Referring to FIG. 12, an RSU may use an installed position as a reference point for relative positioning. When the VRU is detected from an image of a camera installed in the RSU, a relative position of the VRU may be identified through preconfigured information and the like. A position information of the corresponding VRU may be obtained by combining a position of the reference point and the relative position information of the VRU. The accuracy of VRU detection and/or VRU positioning can be improved by comparing the detected and obtained position information of the VRU in this way with the position information of the VRU received through the V2X message.

The first position information of the VRU is obtained through image information. The RSU is installed at a fixed position such as a roadside of a road or the like, and a value of a position indicated by each pixel in an image captured by a camera attached to the RSU is determined already. That is, if you know a pixel value of a position where an image is captured, you can also know a position value. However, since resolution may vary according to a distance from the camera and the like, the error of the position value may also vary. That is, if the camera does not capture a top view, an error range varies for each pixel.

For example, when an RSU camera has a (horizontal) view angle of 120 degrees, the RSU camera is equipped with a 16:9 ratio image sensor and display, a resolution of the display is HD (e.g., 1280×720) (assuming the same pixels of the image sensor), and the RSU camera is installed to face the ground at a tilt angle of 45 degrees from a ground surface, a subject at a distance of 508 m is shown in a top line of the display and each pixel indicates a length of 1 m (width)×63 m (length). On the other hand, a subject at a distance of 5 m is shown in a line corresponding to a $360^{th}$ pixel, which is a midpoint, and each pixel indicates a length of 1.9 cm (width)×2.7 cm (length). In addition, a subject at a distance of 5.6 cm from the camera is shown in a line corresponding to a $720^{th}$ pixel, which is the lowest part and each pixel indicates a length of 0.97 cm (width)×0.7 cm (length).

In other words, when a position of a VRU (or a center point of the VRU) can be determined as a specific pixel or a specific point between specific pixel(s) and other pixel(s), a detection error may vary depending on a position of a pixel, and more particularly, on a pixel position (line, row) in a vertical direction, which determines a distance from the VRU, like the above result. Alternatively, when the RSU detects surrounding VRUs through the RSU camera, the closer the distance between the image sensor, i.e., the camera lens and the VRU gets, the finer the image resolution becomes (e.g., a single pixel contains information of a smaller area) and the smaller the position error of the VRU becomes. On the contrary, the farther the distance between the camera (lens) and the VRU gets, the coarser the image resolution becomes (e.g., a single pixel contains information of a greater area) and the bigger the position error of the VRU becomes.

As illustrated in FIG. 12, the RSU may detect a position of a VRU with a big error through a camera image and the like (long distance) or a small error compared to GNSS based position measurement (close distance). Alternatively, although an RSU has received a PSM message related to a VRU, it may not detect the VRU from the image or the VRU may not be accurately detected due to the properties of a detection environment. For example, when an RSU camera without infrared camera lens and the like attempts to detect a VRU in dark clothes in a dark environment after sunset, the VRU it may not be accurately detected.

Figure 13:
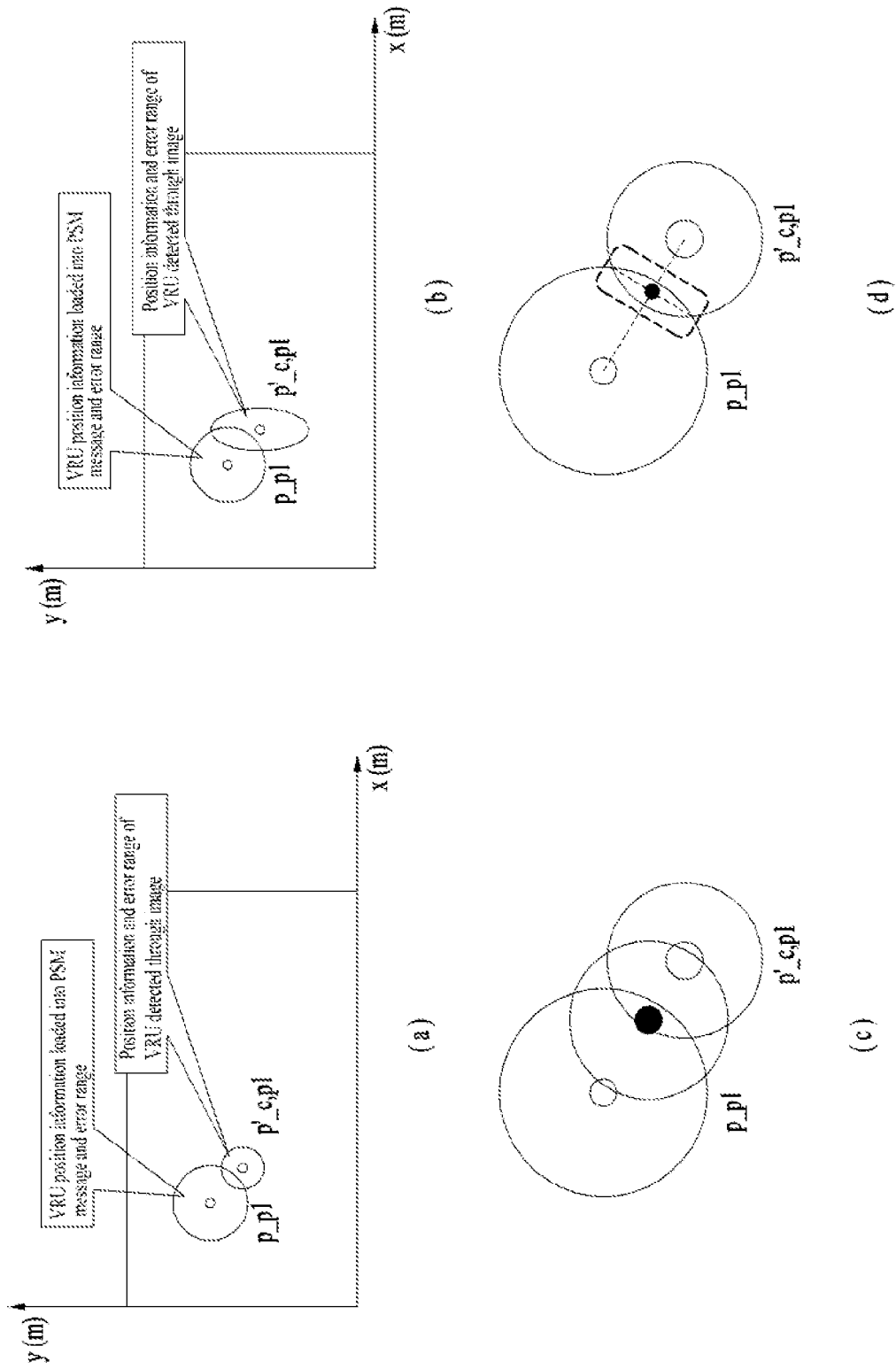

Subsequently, as described above, the position information of the VRU is determined based on the first position information of the VRU obtained through the image information and the second position information of the VRU obtained through the PSM message, which will be described in detail with reference to FIG. 13.

The first position information and the second position information have an error range, and when the values thereof are different according to methods of generating the position information, it may be appropriate that data having a smaller error range becomes a representative value. The position information of the VRU may be determined to be a value having a small error range among the first position information and the second position information. For example, if an error range (e.g., 10 m in both x- and y-axes) of the position information in a PSM message is greater than that (e.g., 3 m in both x- and y-axes) of position information of a VRU detected through an image, as shown in FIG. 13(a), position information of the corresponding VRU can be replaced by position information p'_c,p1 of the VRU (at an associated timing point) detected through the image (e.g., p'_p1=p'_c,p1).

For another example, as shown in FIG. 13(b), an error range (e.g., 10 m in both x-axis and y-axis) of position information loaded into a PSM message is greater than that (e.g., 3 m in x-axis and 15 m in y-axis) of position information of a VRU detected through an image but smaller than that in y-axis, an x-axis value in the position information of the corresponding VRU may be replaced by taking an x-axis value in the position information (p'_c,p1) of the VRU detected through the image and a y-axis value may be replaced by taking a y-axis value in the position information (p-p1) loaded into the PSM message (e.g., p'_p1=complex (real(p'_c,p1), imag(p_p1))). So to speak, an RSU obtains a second position information of a specific VRU (or UE) from a PSM message and also obtains a first position information of the specific VRU (or UE) from an image device. If the obtained first and second position informations have a difference equal to or greater than (or exceeding) a predetermined threshold, the RSU may correct the position information on the VRU based on the second position information. Here, the predetermined threshold may be determined based on the error range related to the image device. In doing so, the corrected position information of the VRU may be forwarded to a surrounding VRU or surrounding UEs as position information on the specific VRU or may be fed back to a network.

Alternatively, the position information of the VRU may be determined based on an error range obtained by averaging the error range of the first position information and the error range of the second position information. That is, a method of averaging a position error by taking an average of samples (or candidates) of a position value may be considered. In this case, a point such as p'_p1=(p'_c, p1+p_p1)/2 is determined as a corrected position, and the position error at this time may be expressed as sqrt(+*(3 m)^2+½* (10 m)^2)=7.38m. In other words, when the accuracy of the corrected position information is loaded into the PSM message, both SemiMajorAxisAccuracy and SemiMinorAxisAccuracy parts are mapped to a value corresponding to 7.38 m (for example, mapped to a value corresponding to 148 or 10010100 in binary if expressed in 0.05 m units).

The position information of the VRU may be included in an intersection of an area corresponding to an error range of the first position information and an area corresponding to an error range of the second position information. If a corrected position value has to be determined within an area in which error ranges of the samples of the position value overlap each other, correction may be performed in a manner shown in FIG. 13(d). Alternatively, the RSU may correct the position information of the VRU based on the first position information and the second position information. For example, the RSU may correct the position information on the VRU by averaging an error range related to the first position information and an error range related to the second position information with respect to the first position information and the second position information. Alternatively, the RSU may correct the position information on the VRU based on an overlapping area between the first position information and the second position information. In this case, the corrected position information of the VRU may be forwarded to the surrounding VRU or the surrounding UEs as the position information on the specific VRU or may be fed back to the network.

Namely, it may be determined in the form of interpolation of two position values, such as p'_p1=a*p'_c, p1+(1−a) *p_p1. In this case, a position error may be expressed as sqrt(a*(3 m)^2+(1−a)*(3 m)^2). Meanwhile, the above-described method may presuppose an overlap between a first area according to the first position information and the error range and a second area according to the second position information and the error range.

Figure 14:
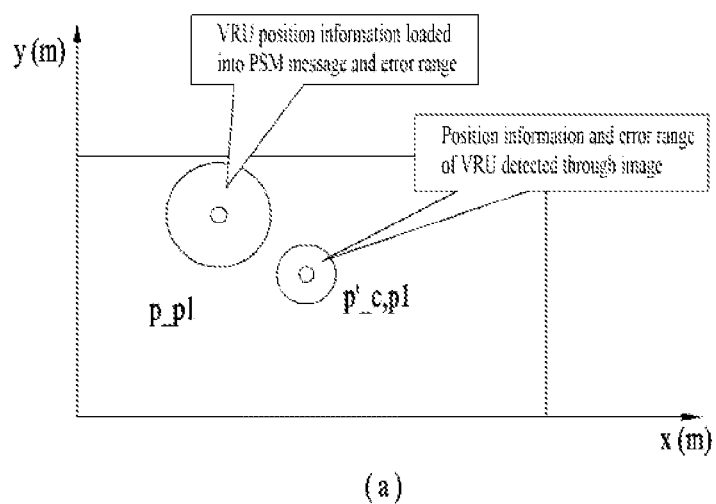
Figure 14:
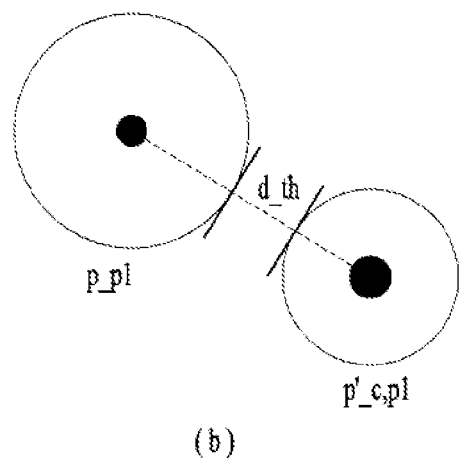

The error range may represent a normal error range such as standard deviation of an error value or the like, and an actual position value may be present in an area out of the range. Therefore, as shown in FIG. 14(a), the above methods may be applied equally even if an error range of position information loaded into a PSM message and an error range of position information of a VRU detected through an image do not overlap each other. However, for example, if a difference between the two position values is very large, as shown in FIG. 14(b), at least one position value may be considered wrong if the error range in between deviates over d_th. The d_th may be a predefined value (e.g., d_th=5 m), or a value associated with the error range of two measurements (e.g., the maximum value (10 m), the minimum value (3 m), or the average value (6.5 m), etc. in the error range). In this case, the RSU may not perform a feedback for requesting an error correction, generation of associated VRU messages (PSM, VRU messages, CPM messages, etc.), and the like. Alternatively, the RSU may not perform any action by considering a value with a larger error range as wrong, or in some cases, may perform feedback or associated VRU message generation to request error correction. The above-described operation may be equally applied when a position in a PSM message of the associated VRU indicates an area other than a display area of an image.

The determined position information may be shared with the other RSU. That is, the corrected value may be fed back to a V2X server (e.g., based on a timing point of DSecond=t_p1) or only the values (e.g., p_c, k and p_c, (k+1), or its corrected form p'c, p1, associated time value(s), error range, etc.) required for correction may be transmitted to the V2X server.

Figure 15:
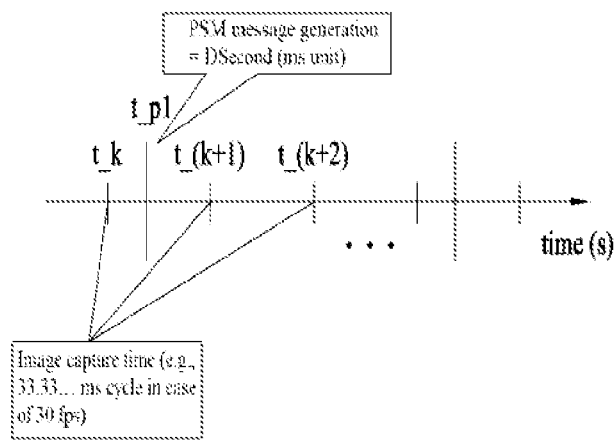
Figure 15:
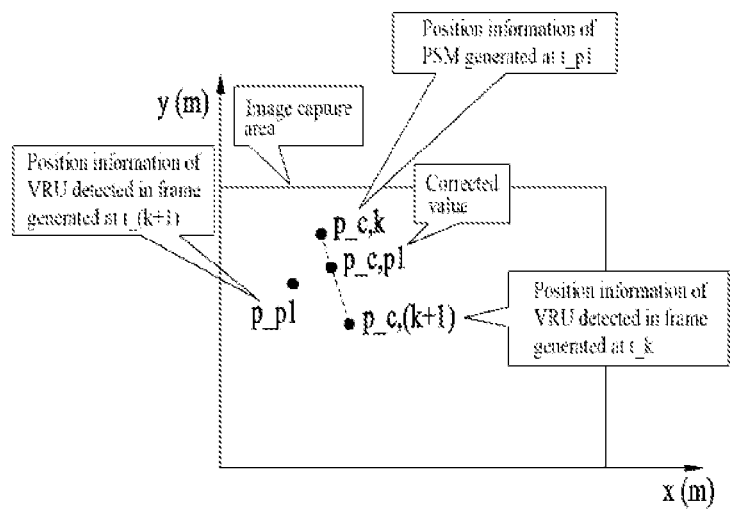

In the above description, it is assumed/presumed that the PSM message and the image information are generated at the same time. Furthermore, the VRU and the RSU may be synchronized with the same base station, or even if they belong to different base stations, the V2X server may process data according to the base station timing therebetween, or use the same GNSS reference time at least. If the PSM message and the image information are not generated at the same time, it is checked whether the same VRU is indicated by comparing a PSM message generation time and a VRU detection time in an image and comparing the VRU's message information (generation timing point and position related information, e.g., PSM message DSecond field and Position related field) occurring in the same or similar time and image information (frame generation timing point of VRU entity detected in each frame and position calculation of a detected VRU). For example, let's assume that a PSM message is generated at a timing point between specific frames of a camera image, i.e., a timing point t_p1 between t_k and t_(k+1). In this case, as shown in FIG. 15(b), a value p'_c,p1, which is generated by appropriately correcting a position p_c,k of a VRU detected in an image generated at t_k, a position p_c,k of a VRU, and a position p_c, (k+1) of a VRU detected in an image generated at t_(k+1) (e.g., linear interpolation) may be compared with a position information p_p1 of a VRU loaded into the PSM message generated at the timing point t_p1. When the linear interpolation is performed, a position error value (0r error range) of the VRU at each timing point may be corrected in the same manner. In this case, in order to reduce a correction error with respect to a position detected from an image, an offset for an image capture may be adjusted to reduce a message reception timing point and an image capture timing point to the minimum after the PSM message reception. For example, when the timing shown in FIG. 15(a) is given, assuming that a PSM message transmission interval (e.g., T_p) is 1 s, an image capture should occur together after 1 second (e.g., t_p2) from t_p1. When the offset value is set as t_ofs and an inter-frame generation interval of an image is set as T_c, it may be summarized as Equation 1 below.

$$t\_p2 = t\_k + t\_ofs + T\_c * n = t\_p1 + (t\_k - t\_p1) + t\_ofs * T\_c * n$$

$$(t\_p2 - t\_p1) = T\_p = (t\_k - t\_p1) + t\_ofs * T\_c * n \quad \text{[Equation 1]}$$

Here, when Tc=1/24 s and n=24, the capture timing point may be delayed by applying offset to the capture timing point by t_ofs=(t_p1−t_k). Alternatively, when n=23, the capture timing point may be advanced by applying the offset of t_ofs=(t_p1−t_k−t_c)=t_p1−t_(k+1).

Figure 16:
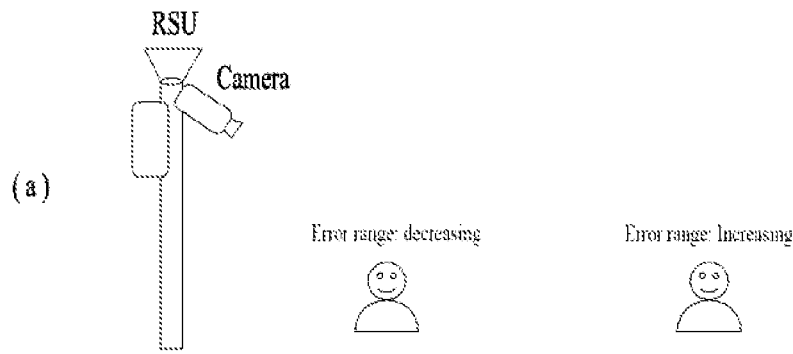
Figure 16:
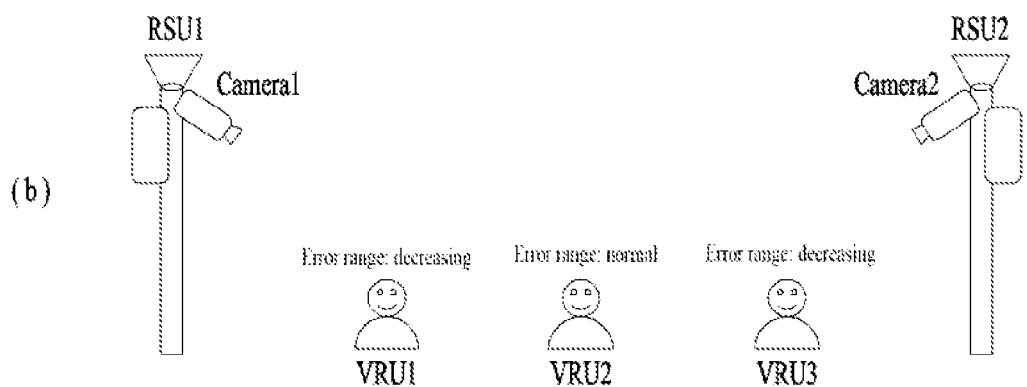
Figure 16:
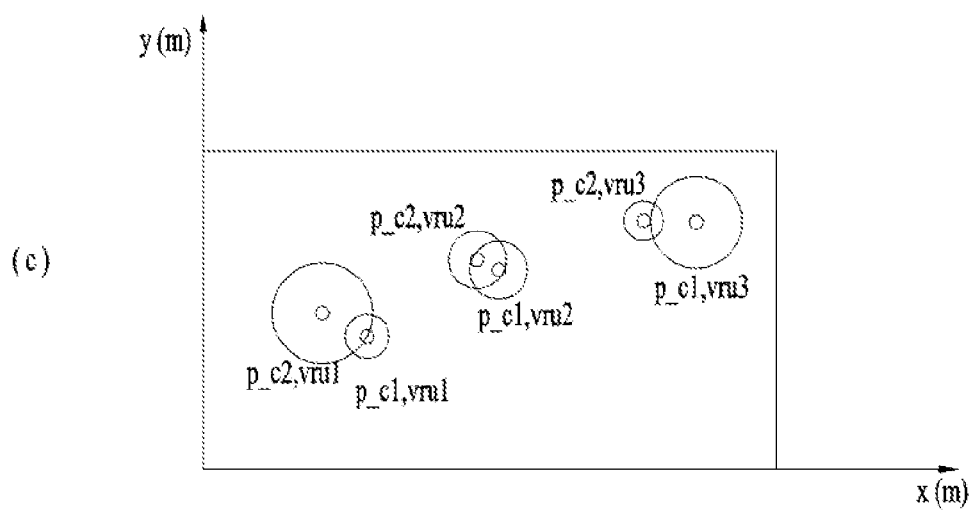

Hereinafter, an RSU camera configuration for reducing a position error will be described. When detecting a position of a VRU based on an image of a camera, it can be seen that an error value varies very greatly depending on a pixel position in a vertical direction on an image sensor or a display. That is, as shown in FIG. 16(a), it may be seen that the closer a subject is, the smaller an error value becomes, and that the farther the subject is, the larger the error value becomes.

In order to prevent this phenomenon, the following method may be considered. For example, as shown in FIG. 16(b), another RSU and camera are further installed on the opposite side where an RSU and a camera are installed, so that a value with a small error range among values detected from the two cameras may be taken as a representative value, in a manner similar to the method described above. To this end, it may be able to perform an operation of sharing image data, detected VRU position values and the like between RSUs and correcting a position value of a VRU by at least one RSU, or an operation of correcting a position value of a VRU by a V2X application server and the like by transmitting image data, a detected VRU position value and the like to a higher network from each RSU. When the RSU is configured as described above, as shown in FIG. 16(c), if the error range increases in one RSU camera, the error range decreases in the remaining RSU camera. If the measured (or corrected) data have the same error range (or a difference equal to or smaller than a predetermined threshold value), the two data may be used by being averaged.

Figure 17:
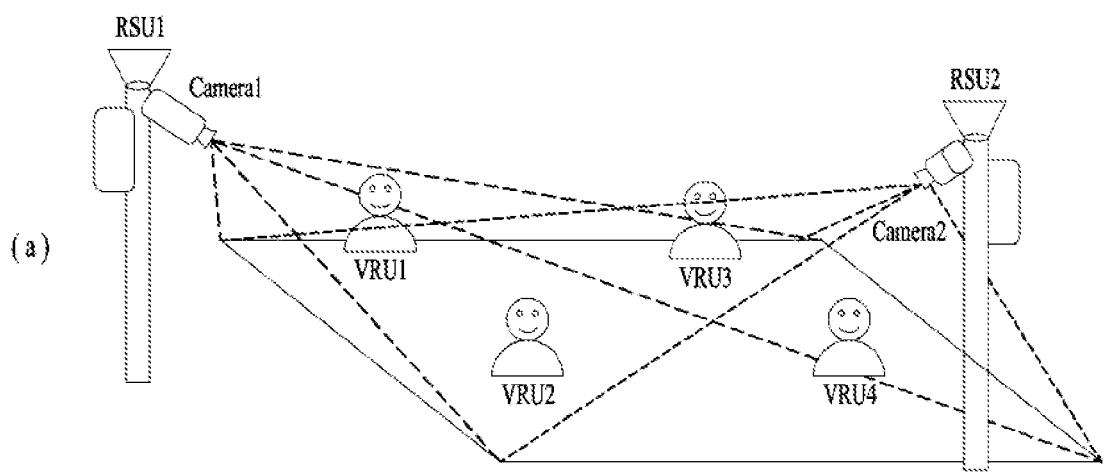
Figure 17:
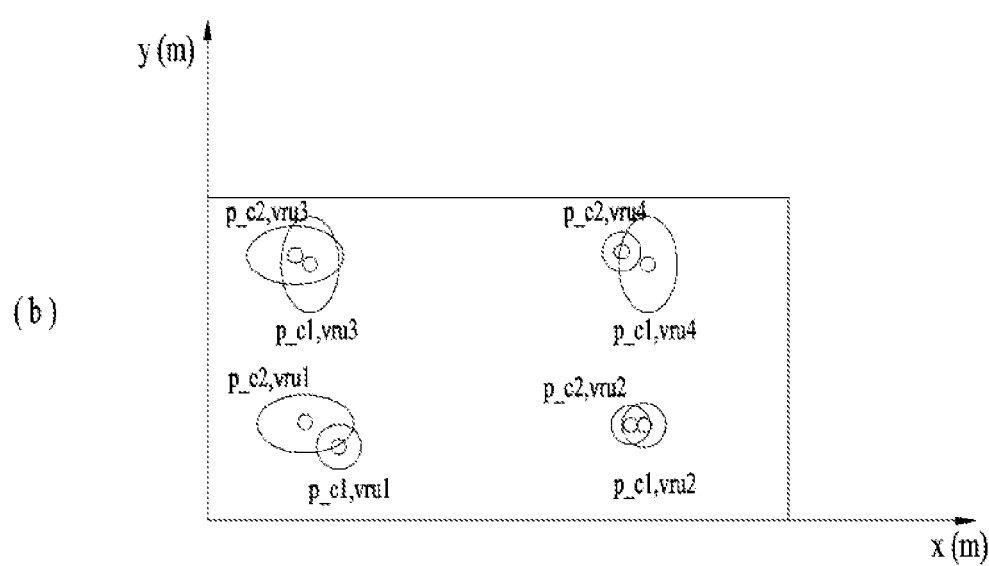

For another example, as shown in FIG. 17(a), two RSU cameras may be set to capture a specific VRU in different directions. More specifically, if the method described above is that RSU1 and RSU2 are disposed at 180° intervals, this method may be said that RSU1 and RSU2 are disposed at 90° intervals. In this case, VRUs (commonly) entering a range of the corresponding RSU camera may offset an error on the x-axis or y-axis by the remaining RSU camera, even if they experience a large error in the x-axis or y-axis direction by a specific RSU camera. That is, as shown in FIG. 17(b), it is appropriate for VRU1 to use the value measured and detected by the RSU1 as a representative value, and it is appropriate for VRU4 to use the value measured and detected by the RSU2 as a representative value. In addition, since VRU2 can be accurately detected by both of the RSU1 and the RSU2, a value having a smaller error may be taken from the two. Alternatively, if the error range of the data measured (corrected) by them are the same (or if there is a difference equal to or smaller than a predetermined threshold value), two data may be averaged to use. In addition, it can be seen that the RSU1 and the RSU2 measure and detect x-axis data and y-axis data of VRU3 with a small error, respectively. In this case, the x-axis data of the RSU1 and the y-axis data of the RSU2 are selectively taken.

Hereinafter, a method of correcting position information of a VRU by an RSU using a single image device or camera will be described.

An RSU may shift a shooting angle of an image device or camera through the following methods, and correct position information of a VRU by comparing an image of the VRU before shift and an image of the VRU after shift.

For example, in addition to the method of using a plurality of RSU cameras like the above-described manners, in order to improve the accuracy of image detection in a situation that a single RSU camera has to be used, the camera may be shifted so that a detected VRU can be located on a lowest end (or a portion further upper than the lowest end to cope with a movement position change of the VRU) of an image (i.e., a position where resolution per pixel is finest). Alternatively, if a plurality of e VRUs are detected, the camera may be shifted so that a VRU detected at a position closest to the RSU is located at the lowest end of the image as described above (or a portion further upper than the lowest end to cope with a movement position change of the VRU) (i.e., a position where resolution per pixel is finest). Alternatively, as another example, the camera may be shifted so that the largest number of VRUs can be detected.

As described above, when a VRU is newly detected by shifting the camera, a corresponding it may be used for VRU position accuracy improvement, VRU determination and the like by being compared with data (e.g., a position of a VRU) before the shift.

Figure 18:
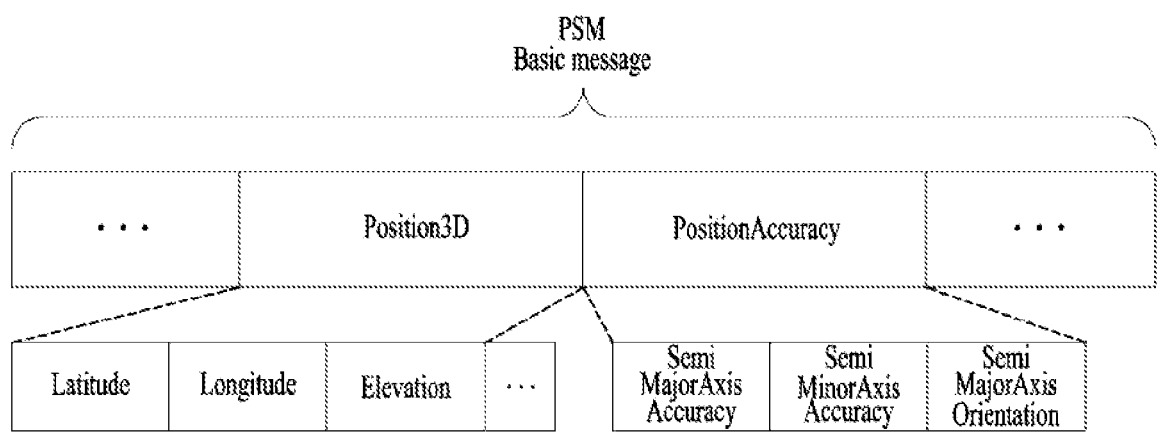

The information related to the position estimation accuracy (error range) may be received through a positioning device (e.g., GNSS, camera) used by each road user, an infrastructure, and a network, and/or may be statistically found by measurement, correction, calculation or the like through a position-based application. As shown in FIG. 18, the above-found position related information such as VRU, pedestrian and the like may be transmitted through a Position3D field and a PositionAccuracy field of a PSM message. A ratio or weight level, in which the first position information and the second position information are reflected, on deriving the position information, or a corresponding value may be mapped to a separate field and included in a PSM/VAM message or other VRU-related message transmitted by the VRU. For example, if the first and second position informations are linearly weighted and synthesized, the fields for weight values W1 and W2 may be included. Alternatively, if the values W1 and W2 are in a specific relationship (e.g. W1+W2=1), only the fields for one weight value (e.g., W1) may be included in a state that such relationship is predefined. In this case, as described above, the position information of the VRU may be based on information obtained by the VRU device itself as well as information obtained from other road users or infrastructure/network, which may need to be distinguished in some cases. For example, when position information is obtained from the first position information and the second position information, a field for distinguishing each source (e.g. S1: VRU (0), S2: RSU (1) . . . ) may be included, and a field distinguishing a unique ID of each source may be separately added. In the case of an entity that does not actually generate and/or transmit the position or the position accuracy related information but supports the positioning (in infrastructure or network), it may be requested to correct a position value while feeding back the values related to the fields.

An eNB receives position information of a VRU and associated correction information from a VRU or infrastructure (e.g., RSU), and a V2X (application) server having the information forwarded thereto from the eNB may continue to receive the corresponding values and use them in correcting the position information of the VRU. In addition, a PSM message containing a corrected position value of the VRU or the corresponding information may be forwarded to the V2X server. Thus, the eNB may transmit the PSM message containing the corrected position information of the VRU or the corresponding information to surrounding road users.

The above description presupposes that the VRU is detected from the camera image of the RSU. If the VRU is not detected from the camera image, the following method may be used.

Position information contained in a PSM message may be recognized as a position of a VRU. If correction is not made from this, a separate feedback is not sent to a V2X server or the V2X server is informed that there is no intention to make a request for correction. Alternatively, although a VRU is not detected from a camera image, if the position information contained in the PSM message indicates a specific point in an image area, as shown in FIG. 19(a), it may be assumed that an actual position of the VRU is within an error range from the PSM position information. Therefore, as shown in FIG. 19(b), a specific point in an intersection between an image external area and a PSM position information error range may be recognized as a position of the VRU. For example, a position closest to the PSM position information received in the corresponding area or a (extended external) pixel may be recognized as a position of the VRU. In this case, if the pixel at the corresponding position has a large error range, as shown in FIG. 19(c), a boundary region (half-pixel) between the pixels may be recognized as a position of the VRU. Alternatively, as shown in FIG. 19(d), an internal pixel in contact with the external pixel may be recognized as a position of the VRU.

Figure 19:
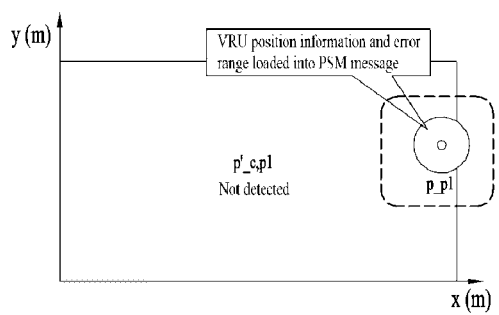
Figure 19:
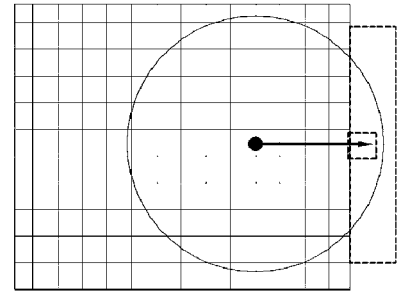
Figure 19:
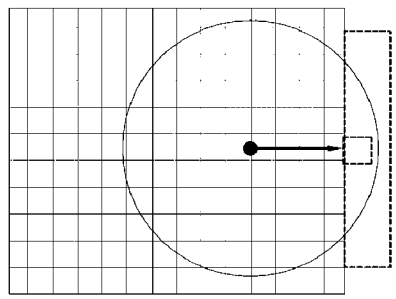
Figure 19:
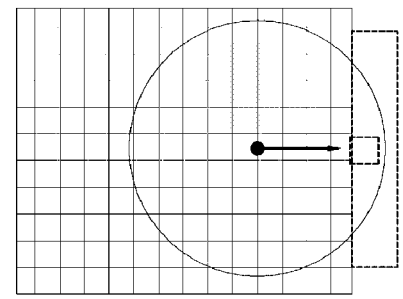
Figure 20:
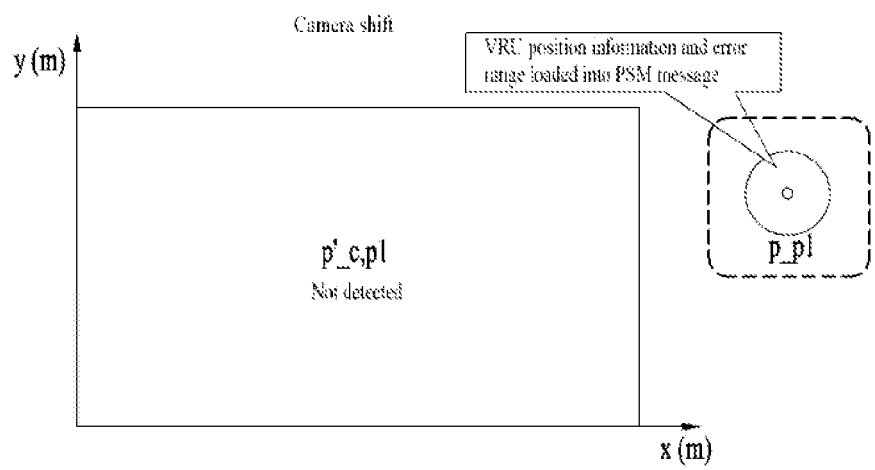
Figure 20:
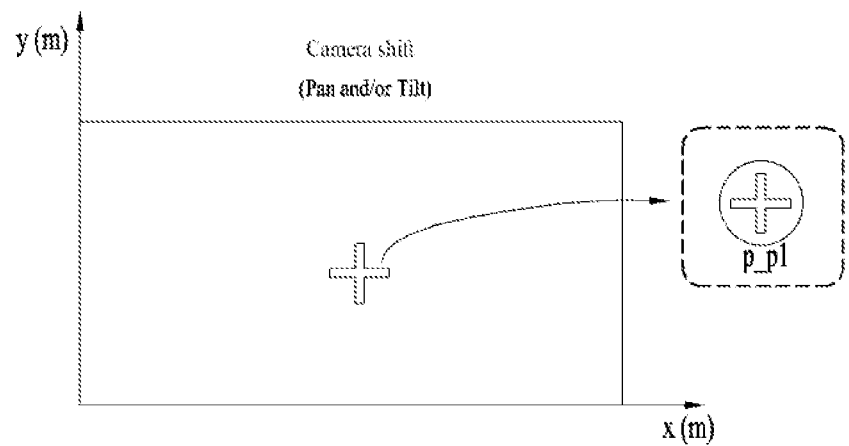

As shown in FIG. 19, VRU position information in a message transmitted by a VRU may enter an image range of a camera (a situation that it may deviate from the image range in consideration of an error range). Alternatively, as shown in FIG. 20(a), position information of a VRU may be located out of the image range of the camera. In this case, an RSU may shift a shooting position of the camera or an image device so that an RSU having transmitted the PSM is located in the image range. Specifically, a camera is shifted by performing a pan and/or tilt operation so that a position of a VRU, which is received by moving the camera to verify information of a VRU message in such a situation as shown in FIG. 19(a) or FIG. 20(a), can enter an image range of the camera (or, a center or lowest end of an image (i.e., a place having the highest resolution while being a position closest to an RSU camera)). In this case, if an image of a targeted VRU is not detected, a camera position is shifted by sweeping a position of the VRU across the entire image range (e.g., top left portion~bottom right portion) while continuing to detect the VRU. Alternatively, since this method requires too much computation and may take too much time, it is possible to shift the camera to a specific point (e.g., shift the camera to detect the VRU at the corresponding point by dividing the entire area into nine equal parts). Alternatively, the RSU may estimate the direction and angle to shift the shooting position of the camera or image device based on mobility information included in the PSM, and may shift the camera or the image device to the estimated direction and angle. Here, the mobility information may include a movement direction, a movement speed, and the like of the VRU.

Alternatively, if it is difficult to detect a VRU according to its image device (lack of light intensity, sunset, sunrise, device failure), the VRU may treat the VRU position information included in the PSM as valid without performing additional correction on the VRU position information included in the PSM.

Figure 21:
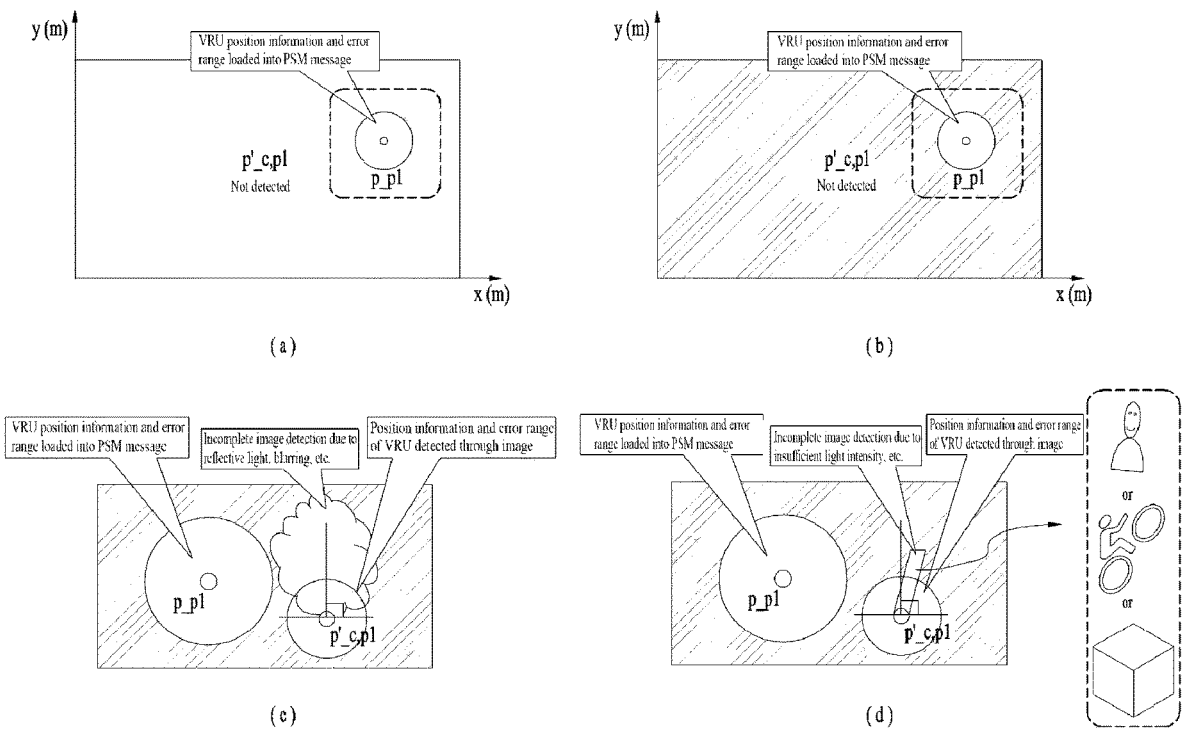

Alternatively, as shown in FIG. 21(a), if a position of a VRU is determined as incorrect despite considering the error range of PSM position information, an RSU may feed back to a V2X server that position information of the VRU is abnormal, or may not do any feedback not to be involved e in the corresponding event. Yet, as shown in FIG. 21(b), if the accuracy of an image is very low due to a lack of light intensity (i.e., absence of night photographing equipment such as infrared lamps, lenses, etc.), there is no basis for judging information of a received message. Hence, the received position information is regarded as valid, thereby feeding back to the V2X server that position information of the VRU is normal or making no feedback not to be involved in the corresponding event.

Yet, there may be a possibility that a VRU entity may be incompletely detected as an image due to reflected light, ambient lighting (road user, etc.) and the like in such a situation as shown in FIG. 21(b), for example, in a situation where light intensity is insufficient at night after sunset. In this case, as shown in FIG. 21(c), a detection area may be displayed more broadly than the real or blurred due to illumination, shadow, etc. Alternatively, as shown in FIG. 21(d), although a specific entity is detected with a small error to be appropriate for specifying a position, it may be difficult to determine whether the corresponding entity is a VRU or another object on a road or sidewalk.

In case of FIG. 21(c), the methods listed above are used to process the corresponding detection image information, but for example, an error range by the image detection may be applied larger (e.g., two times, 3 m→6 m) than the general case (e.g., 3 m 6 6m), so that the weight for position information of a PSM message can be reflected highly. Or (extremely), if a difference in the error range between two position values is within a given constant value (i.e. d_th), only the information in the PSM message is considered valid, thereby feeding back to the V2X server that position information of the VRU is normal or making no feedback not to be involved in the corresponding event.

Although the case of FIG. 21(d) is also an incomplete detection situation, only the information of the PSM message may not be considered valid. For example, if a set of candidate groups such as pedestrians, cyclists, or packaging boxes (objects) is determined (with similar probability) through image processing, position informations (and/or position error ranges) of the received PSM message (s) are compared with the image detected position (p'_c,p1) (and/or error range) and the methods listed above are applied, thereby finding out whether there exists a PSM message having similarity (or an associated PSM message). If a VRU type of the corresponding message exists in the set of the (VRU) candidate groups, the PSM message may be confirmed as valid. If the VRU type of the corresponding message does not exist in the set of the (VRU) candidate groups, the RSU may determine an error in the image detection (VRU type determination) of the camera. The RSU may feed back to the V2X server that there is no abnormality in the PSM message and position information of the VRU, or may not perform any feedback to avoid involvement in the corresponding event.

Alternatively, the RSU may determine whether the position information included in the PSM is valid based on the light intensity or time zone when the PSM including the position information within the shooting range of the image device is received but the VRU, etc. transmitting the PSM is not clearly recognized in the image device. For example, the RSU may estimate that the position information according to the PSM is valid even if the VRU is not clearly detected by the camera at a position corresponding to the position information of the PSM when a sunset or night situation is estimated as having difficulty in image detection based on time and/or light intensity. Alternatively, the RSU may increase the error range of the position information obtained by the image device based on time and/or light intensity, thereby determining the validity of the position information of the PSM.

If VRU-related prior information exists, including the VRU position information contained in the PSM message of the VRU, it may be used as a condition for VRU determination or as an input to an artificial intelligence learning algorithm for VRU detection.

For example, if a position and the like are tracked for a predetermined period in determining an entity detected by the RSU camera, related mobility data (e.g., speed, direction, acceleration, etc.) derived from the corresponding data can also be found, and it can be compared with PSM data or a message (e.g., BSM) transmitted from the detected entity (e.g., vehicle), whereby association can be checked. In addition, if it is found that the data (e.g., mobility data) obtained from the detected image is not associated with the data of the received V2X messages at all, the corresponding entity may be determined as a non-equipped road user. In this case, based on the map data, mobility data, etc. of the corresponding road user, it is possible to determine a type of the road user, e.g., whether it is a VRU (e.g., pedestrian, cyclist, etc.) or a vehicle.

Besides, additional information on the road user may be transmitted through a PSM message, a BSM message, or other additional V2X messages (e.g., VRU Awareness Message (VAM)). For example, data on the appearance of a road user may be loaded and transmitted. More specifically, in the case of a pedestrian road user, long-term valid information (i.e. long-term information) such as height, gender, skin color, etc. may be simply entered into device registration, initialization timing, etc. In addition, frequently changing informations such as the color of clothes on the day and the like may be manually entered through an application related to a corresponding road user (i.e. VRU), or a reminder requesting selfie photography and the like may be sent to guide a user to take pictures. Alternatively, if there is a photo taken before going out or a photo taken while walking after going out, the above application may search for and recognize a user's device and use it to generate information of a VRU, and more particularly, information related to appearance.

Alternatively, more explicitly, a road user type, and more specifically, a vehicle type, a VRU type and the like may be mapped to messages sent by road users, and this information may be used to be compared with information detected from an image. In the case of a VRU, for example, a user type may be changed depending on a situation. For example, it may be changed from a pedestrian mode on a sidewalk to a passenger mode while riding public transportation, to a driver mode or a vehicle mode while boarding a private vehicle. This may be determined using a combination of sensor informations of a device or V2X communication (or other communication systems) with the transportation means in use.

Figure 22:
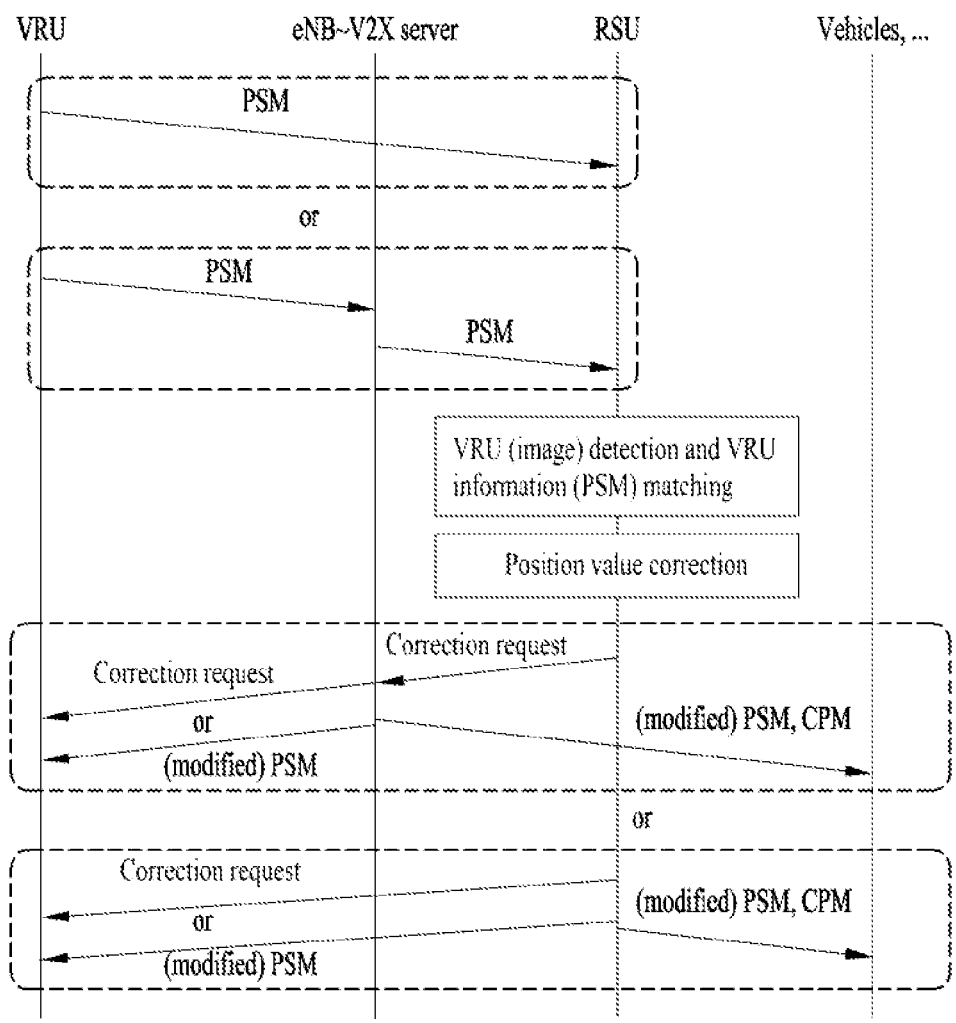

Meanwhile, when a VRU is detected by a camera of an RSU, the RSU compares information on the corresponding VRU with a V2X (VRU) message received previously (or received after delay of a predetermined time), thereby checking the validity of the information. In this case, if there is a VRU message associated with the VRU detected by the RSU, the RSU may perform a feedback on the corresponding message or make a request for this if modification of the information is necessary (or information indicating modification is not necessary may be fed back). As shown in FIG. 22, this may be received directly from the VRU through the PC5 interface or from an eNB through a higher network. In the latter case, the VRU may have transmitted a PSM message and the like to the eNB through Uu interface or the like, and the eNB may have retransmitted (forwarded) them to the RSU through the Uu interface or a wired interface. In this case, the eNB may have collected or clustered messages of a plurality of VRUs and transmitted them to the RSU.

If the corresponding VRU related image is detected by the RSU camera, a detected position is calculated using the above method or the like, this value is corrected by considering a PSM generation timing point and the like, a VRU position information correction request is fed back to a higher network such as a V2X server or the like based on the corrected value, a request of the RSU is handled, and modified information of the VRU is transmitted through a regenerated PSM message, CPM, other VRU related messages and the like. In doing so, when the RSU makes a request for position correction or CPM message generation to the V2X server, informations extracted from the raw data generated during image detection may be transmitted.

For example, the RSU may transmit image captured time(s), calculated VRU position(s) matching the corresponding time(s), (positioning) accuracy of a corresponding measurement value and the like to the eNB, and the V2X server having them forwarded thereto may redundantly transmit a PSM message having position correction and the like performed thereon or a CPM message including the corresponding information to surroundings again or make a request for position information correction or the like to the corresponding VRU. In doing so, the corrected position value may be transmitted to the corresponding VRU, or a correction value (e.g., a difference value amounting to delta) of the position information may be transmitted. Alternatively, for another example, the RSU may transmit the corrected position information. A position value (e.g., Position3D, PositioningAccuracy, etc.) corresponding to the corresponding timing point is generated with reference to a PSM message generated time based on image detection and then transmitted to the eNB. The V2X server having the value forwarded thereto may redundantly transmit a PSM message having position correction and the like performed thereon or a CPM message including the corresponding information to surroundings again or make a request for position information correction or the like to the corresponding VRU. In doing so, the corrected position value may be transmitted to the corresponding VRU, or a correction value (e.g., a difference value amounting to delta) of the position information may be transmitted.

Alternatively, the RSU may regenerate a PSM message in direct without feeding back a position correction request and the like to a higher network or generate a CPM or other VRU related messages and the like, thereby transmitting modified information of the VRU to surroundings.

The PSM message, the CPM message and the like generated above may be the informations (position estimation, correction value, etc.) generated at the same timing point as indicated in the message transmitted by the VRU, the eNB and the like or the informations generated at a (new) timing point of capturing a camera image or other timing points.

Having received a PSM message of the same ID generated at the same timing point (or before/after a predetermined offset) as indicated in the message transmitted by the VRU, the eNB, or the like, road users may select and use a (more accurate) message by comparing positioning accuracy and the like.

Figure 23:
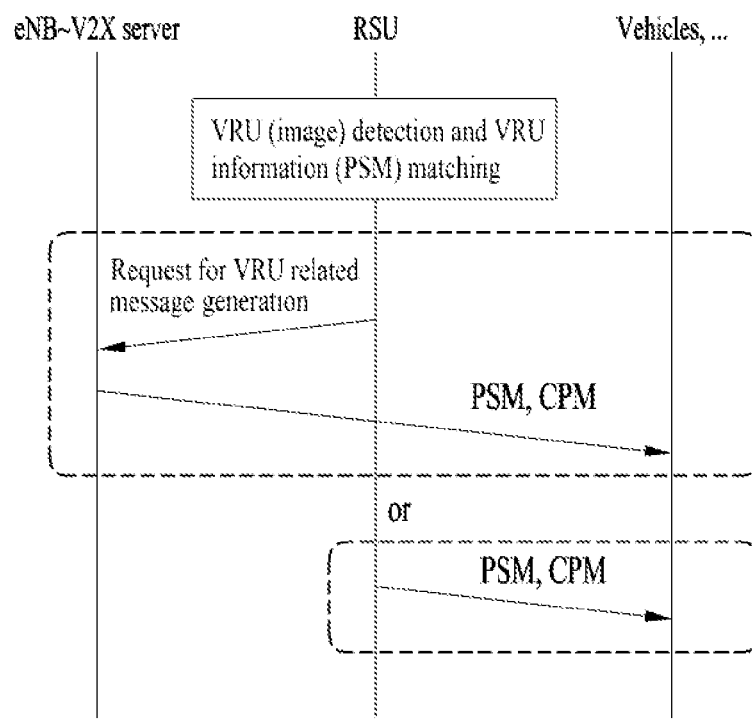

Although a VRU is detected by a camera of an RSU, if an associated VRU message fails to exist, as shown in FIG. 23, the RSU may request a higher network to (newly) generate a PSM or CPM message for a related VRU and the like. Alternatively, the RSU may directly generate and transmit a PSM message or an associated CPM message to surroundings.

Meanwhile, when a VRU specific zone and/or a vehicle specific zone is configured in an area covered by the RSU, the RSU may grasp that the VRU belongs to which zone or that the VRU switches a zone at which timing point and use it as prior information for VRU detection. For example, although a VRU is configured to transmit a PSM message whenever moving by switching a zone, if a corresponding message is not received despite that a timing point at which the corresponding VRU is scheduled to transmit the PSM message has passed or despite waiting for a predetermined time (e.g., behind 2000 ms after detection of the VRU/s zone switching operation), the RSU may directly request the corresponding VRU to transmit a message for a status change or report VRU detection information and status change (e.g., zone switching) information to a higher network.

Regarding the above description, a Road Side Unit (RSU) performing a Vulnerable Road User (VRU) related operation may include at least one processor and at least one computer memory operably connected to the at least one processor and storing instructions to enable the at least one processor to perform operations, the operations including receiving a PSM message of a VRU, determining a position information of the VRU based on a first position information of the VRU obtained through an image information and a second position information of the VRU obtained through the PSM message, and transmitting the position information of the VRU to the VRU.

In a processor performing operations for a Road Side Unit (RSU) in a wireless communication system, the operations may include receiving a PSM message of a VRU, determining a position information of the VRU based on a first position information of the VRU obtained through an image information and a second position information of the VRU obtained through the PSM message, and transmitting the position information of the VRU to the VRU.

In a non-volatile computer-readable storage medium storing at least one computer program including an instruction for enabling at least one processor to perform operations for a UE when executed by the at least one processor, the operations may include receiving a PSM message of a VRU, determining a position information of the VRU based on a first position information of the VRU obtained through an image information and a second position information of the VRU obtained through the PSM message, and transmitting the position information of the VRU to the VRU.

An operation of a Vulnerable Road User (VRU) related to a Road Side Unit (RSU) may include transmitting a PSM message to the RSU by the VRU and receiving a position information of the VRU from the RSU by the VRU, and the position information of the VRU may be determined based on a first position information of the VRU obtained by the RSU through an image information and a second position information of the VRU obtained through the PSM message.

A Vulnerable Road User (VRU) related to a Road Side Unit (RSU) in a wireless communication system may include at least one processor and at least one computer memory operably connected to the at least one processor and storing instructions to enable the at least one processor to perform operations, the operations including transmitting a PSM message to the RSU by the VRU and receiving a position information of the VRU from the RSU by the VRU, and the position information of the VRU may be determined based on a first position information of the VRU obtained by the RSU through an image information and a second position information of the VRU obtained through the PSM message.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
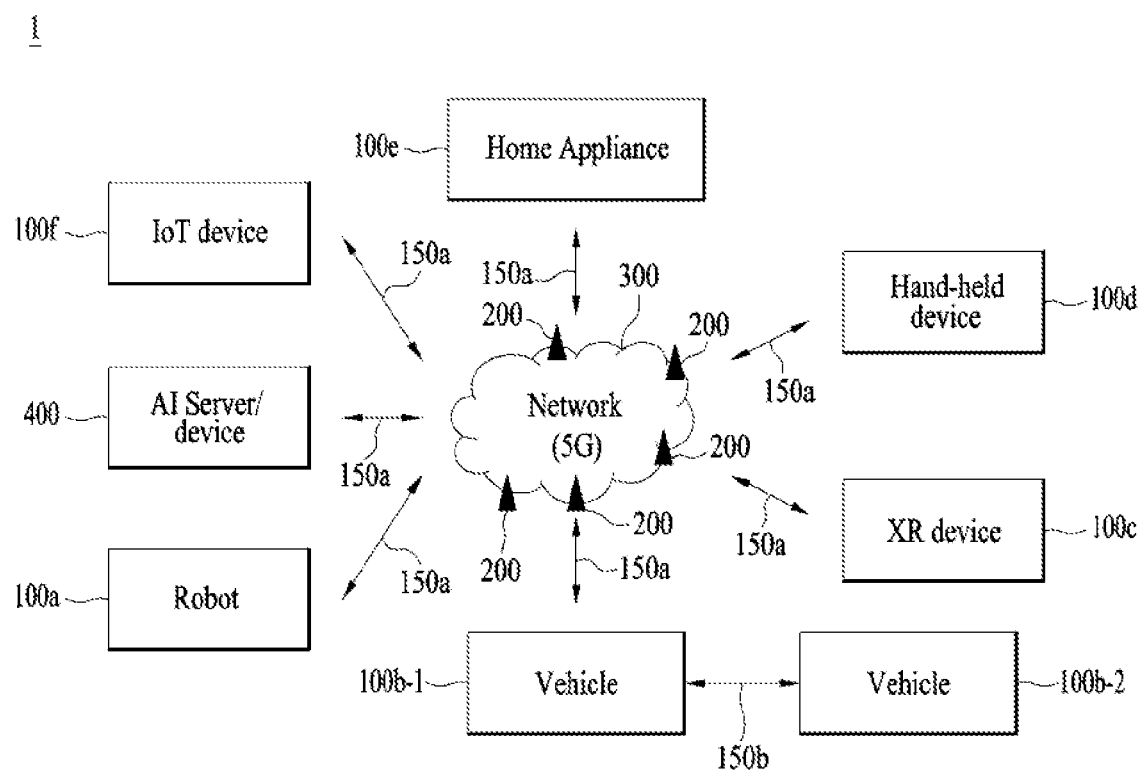
FIGS. 24 to 30 are diagrams illustrating various devices to which embodiment(s) may be applicable.

FIG. 24 illustrates a communication system 1 applied to the present disclosure.

Referring to FIG. 24, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 25:
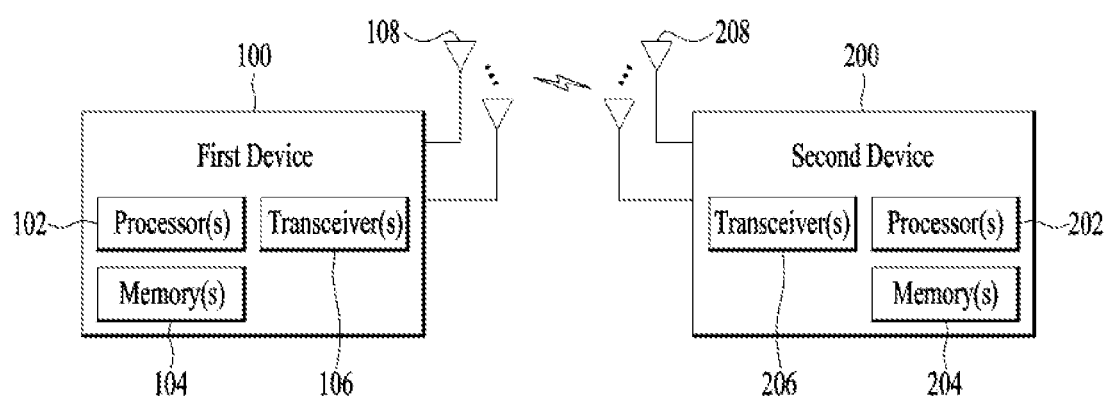

FIG. 25 illustrates wireless devices applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 26:
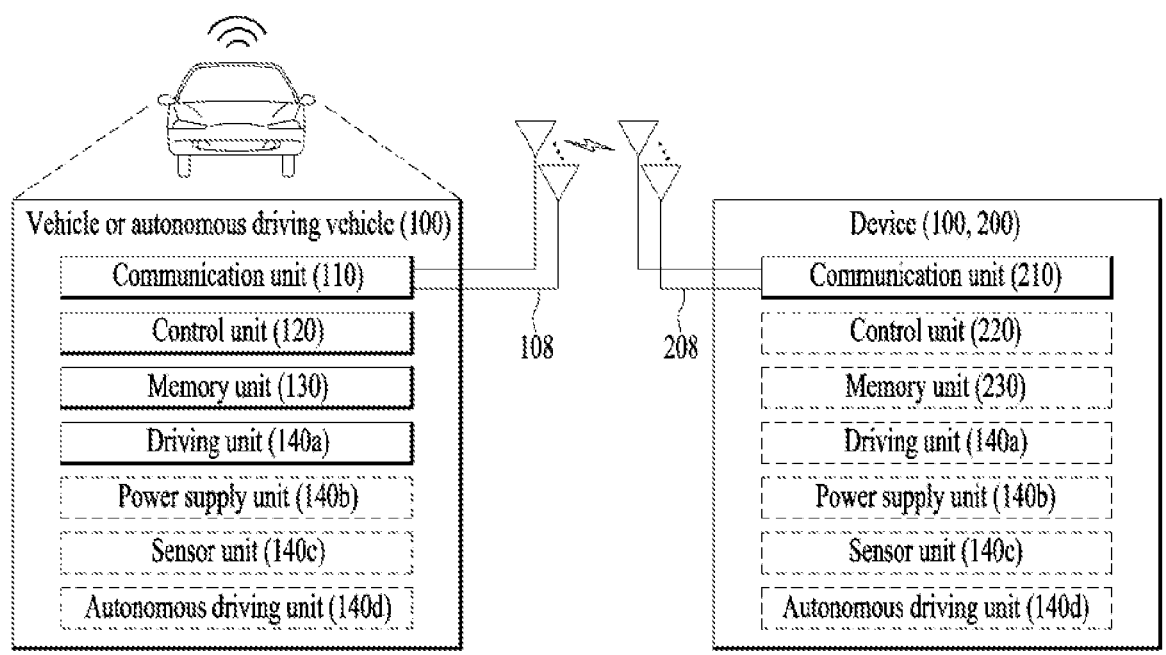

Examples of a Vehicle or an Autonomous Driving Vehicle Applicable to the Present Disclosure FIG. 26 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 27:
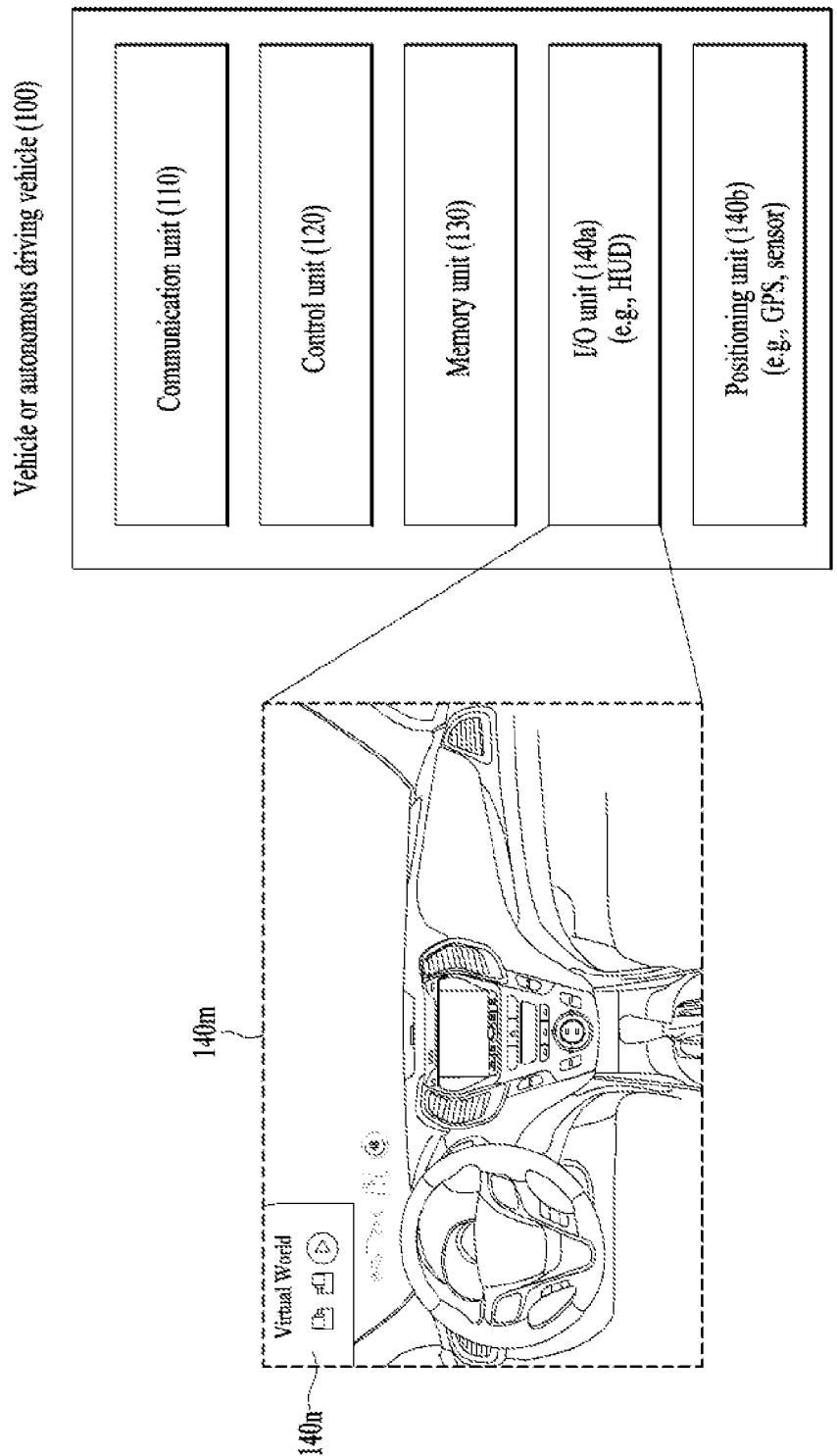

FIG. 27 illustrates a vehicle applied to the present disclosure. The vehicle may be implemented as a transport means, an aerial vehicle, a ship, etc.

Referring to FIG. 27, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 28:
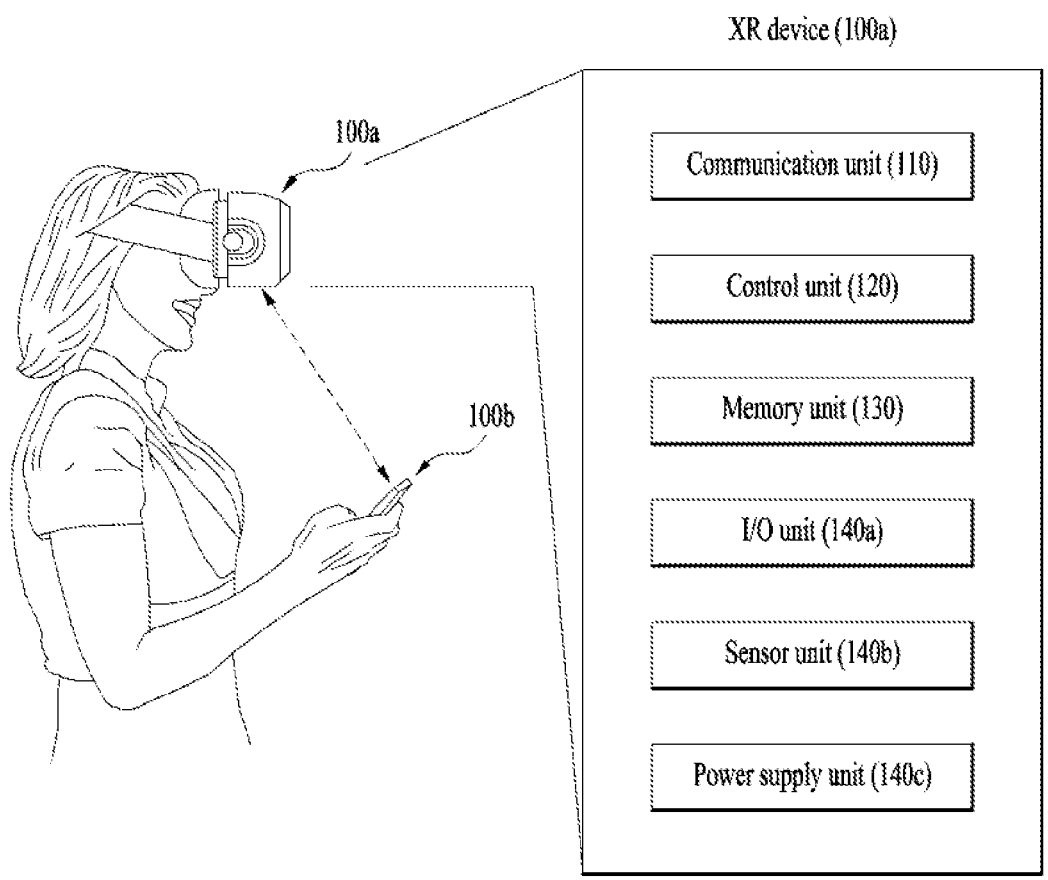

FIG. 28 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 28, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 29:
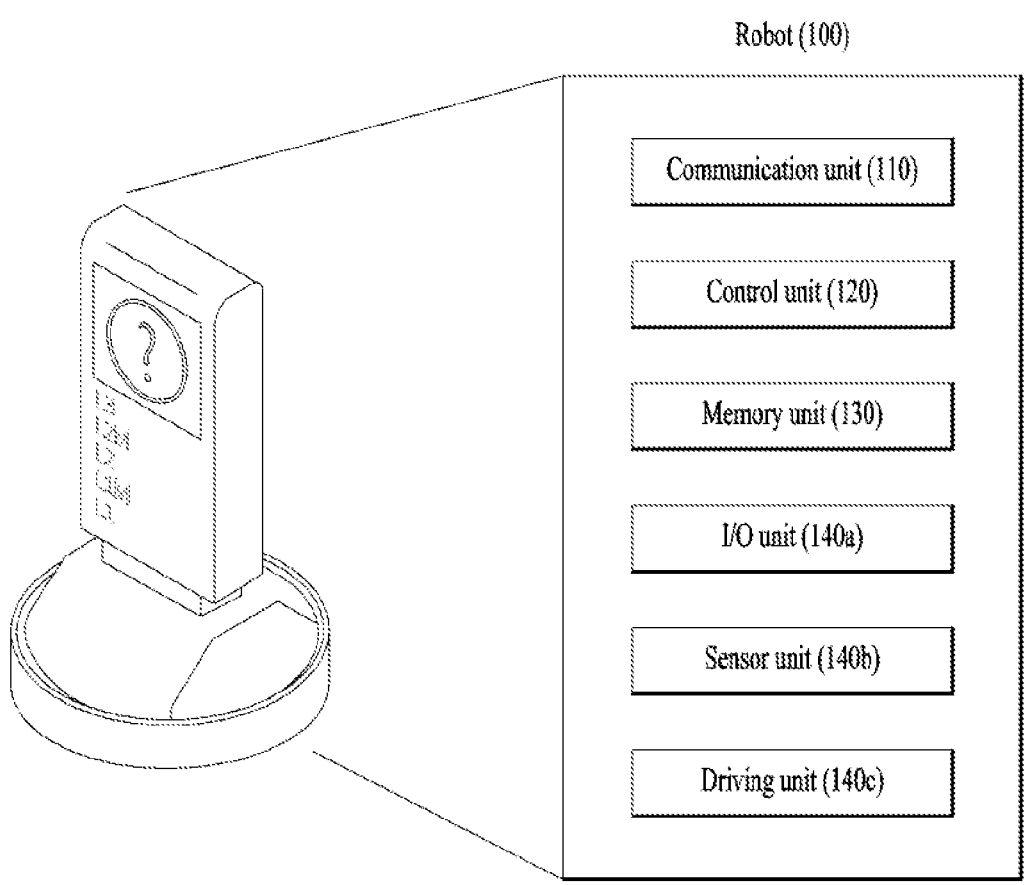

FIG. 29 illustrates a robot applied to the present disclosure. The robot may be categorized into an industrial robot, a medical robot, a household robot, a military robot, etc., according to a used purpose or field.

Referring to FIG. 29, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 30:
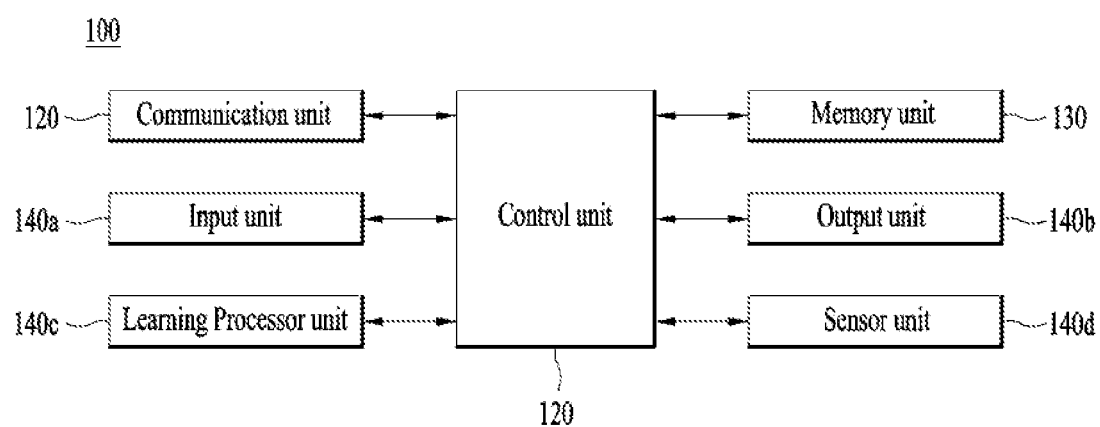

FIG. 30 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 30, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 24) or an AI server (e.g., 400 of FIG. 24) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 24). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 24). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. A method of operating a first device related to a second device in a wireless communication system, the method comprising:
   receiving a Personal Safety Messages (PSM) message of the second device by the first device;
   determining a position information of the second device by the first device; and
   transmitting the position information of the second device to the second device by the first device,
   wherein the position information is determined based on a first position information of the second device obtained through an image information and a second position information of the second device obtained through the PSM message,
   wherein the image information is taken by the first device in an observation area so as to be shared with another first device.

2. The method of claim 1, wherein when the position information of the second device is determined, a weight is applied to each of the first and second position information.

3. The method of claim 1, wherein, based on the PSM message being generated at a timing point between a first frame and a second frame, the first position information is obtained by applying linear interpolation to a first position related to the first frame and a second position related to the second frame, and an offset is applied to a capture timing point of the first device.

4. The method of claim 3, wherein the position information of the second device is shared with the another first device.

5. The method of claim 4, wherein the position information of the second device includes a weight information of the first position information for the second position information used for position determination.

6. The method of claim 1, wherein the PSM message includes the position information obtained by the second device through Global Navigation Satellite System (GNSS).

7. The method of claim 1, wherein the PSM message includes the position information obtained by the second device through another first device, another second device or a base station.

8. The method of claim 1, wherein the position information of the second device is determined as a value having a small error range in the first position information and the second position information.

9. The method of claim 1, wherein the position information of the second device is determined based on an error range resulting from averaging an error range of the first position information and an error range of the second position information.

10. The method of claim 9, wherein the position information of the second device is included in an intersection between an area corresponding to the error range of the first position information and an area corresponding to the error range of the second position information.

11. The method of claim 1, wherein the first device is a Road Side Unit (RSU) and the second device is a Vulnerable Road User (VRU).

12. A first device performing a second device related operation, the first device comprising:
    at least one processor; and
    at least one computer memory operably connected to the at least one processor and storing instructions to enable the at least one processor to perform operations, the operations comprising:
    receiving a PSM message of a second device;
    determining a position information of the second device; and
    transmitting the position information of the second device to the second device,
    wherein the position information is determined based on a first position information of the second device obtained through an image information and a second position information of the second device obtained through the PSM message,
    wherein the image information is taken by the first device in an observation area so as to be shared with another first device.

13. A method of operating a second device related to a first device in a wireless communication system, the method comprising:
    transmitting a PSM message to the first device by the second device; and
    receiving a position information of the second device from the first device by the second device,
    wherein the position information of the second device is determined based on a first position information of the second device obtained by the first device through an image information and a second position information of the second device obtained through the PSM message,
    wherein the image information is taken by the first device in an observation area so as to be shared with another first device.

14. A second device related to a first device in a wireless communication system, the second device comprising:
    at least one processor; and
    at least one computer memory operably connected to the at least one processor and storing instructions to enable the at least one processor to perform operations, the operations comprising:
    transmitting a PSM message to the first device by the second device; and
    receiving a position information of the second device from the first device by the second device,
    wherein the position information of the second device is determined based on a first position information of the second device obtained by the first device through an image information and a second position information of the second device obtained through the PSM message, wherein the image information is taken by the first device in an observation area so as to be shared with another first device.

* * * * *